United States Patent
Baptist et al.

(10) Patent No.: US 8,886,905 B2
(45) Date of Patent: *Nov. 11, 2014

(54) DISPERSED STORAGE NETWORK VIRTUAL ADDRESS GENERATIONS

(75) Inventors: Andrew Baptist, Chicago, IL (US); Greg Dhuse, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 145 days.

This patent is subject to a terminal disclaimer.

(21) Appl. No.: 13/594,199

(22) Filed: Aug. 24, 2012

(65) Prior Publication Data

US 2013/0006923 A1    Jan. 3, 2013

Related U.S. Application Data

(63) Continuation of application No. 12/764,930, filed on Apr. 21, 2010, now Pat. No. 8,275,966.

(60) Provisional application No. 61/230,019, filed on Jul. 30, 2009.

(51) Int. Cl.
*G06F 12/00* (2006.01)
*G06F 9/46* (2006.01)
*G06F 11/10* (2006.01)
*G06F 12/10* (2006.01)
*G06F 11/20* (2006.01)

(52) U.S. Cl.
CPC ........ *G06F 12/1009* (2013.01); *G06F 11/2094* (2013.01); *G06F 11/1076* (2013.01); *G06F 2211/1028* (2013.01)
USPC ............ 711/162; 711/114; 711/170; 718/105

(58) Field of Classification Search
CPC ... G06F 3/0631; G06F 3/0608; G06F 3/0644; G06F 9/5077; G06F 11/2289; G06F 12/023; G06F 12/0653
USPC ........... 711/114, 170, 171, 172, 173; 718/105
See application file for complete search history.

(56) References Cited

U.S. PATENT DOCUMENTS

| | | | |
|---|---|---|---|
| 5,748,985 A * | 5/1998 | Kanai ........................... | 711/130 |
| 7,636,724 B2 | 12/2009 | de la Torre et al. | |
| 7,840,537 B2 * | 11/2010 | Gokhale et al. ............... | 707/652 |
| 8,010,496 B2 * | 8/2011 | Okada et al. .................. | 707/653 |
| 2009/0125692 A1* | 5/2009 | Yamamoto et al. .......... | 711/162 |
| 2012/0203928 A1* | 8/2012 | Gorodetsky et al. .......... | 709/238 |

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

*Primary Examiner* — Reginald Bragdon
*Assistant Examiner* — Mehdi Namazi
(74) *Attorney, Agent, or Firm* — Garlick & Markison; Holly L. Rudnick

(57) ABSTRACT

A dispersed storage device within a dispersed storage network includes a processing module for determining whether to add a new generation for a vault, in which the vault identifies at least one user having data to be stored. When the new generation is to be added to the vault, the processing module further assigns a vault generation identifier to the new generation and reserves memory for the new generation.

20 Claims, 22 Drawing Sheets

| Slice name 45 | | | | |
|---|---|---|---|---|
| Routing Information 91 | | | Vault Specific Information 93 | |
| Slice index 65 | Vault ID 55 | Vault gen 75 | Resv 99 | Vault Specific source data name 95 |
| 00......... | λ | 0 | 0 | Various file and segment IDs or block IDs 97 |
| 01......... | | | | |
| 10......... | | | | |
| 11......... | | | | |

Pillar 0
Pillar 2
Pillar 1
Pillar 3

FIG. 8

| Slice name 45 | | | | |
|---|---|---|---|---|
| Routing Information 91 | | | | Vault Specific Information 93 |
| Slice index 65 | Vault ID 55 | Vault gen 75 | resv 99 | Source data name 95 |
| 00............ | λ | 0 | 0 | Source data names |
| 00............ | λ | 1 | 0 | Source data names |
| 01............ | λ | 0 | 0 | Source data names |
| 01............ | λ | 1 | 0 | Source data names |
| 10............ | λ | 0 | 0 | Source data names |
| 10............ | λ | 1 | 0 | Source data names |
| 11............ | λ | 0 | 0 | Source data names |
| 11............ | λ | 1 | 0 | Source data names |

DS Unit: Pillar 0 old/new, Pillar 2 old/new, Pillar 1 old/new, Pillar 3 old/new

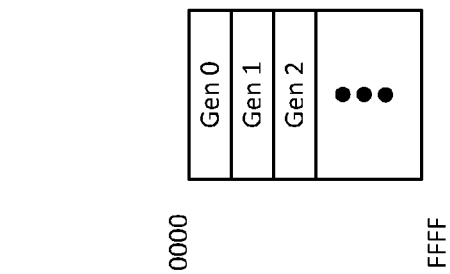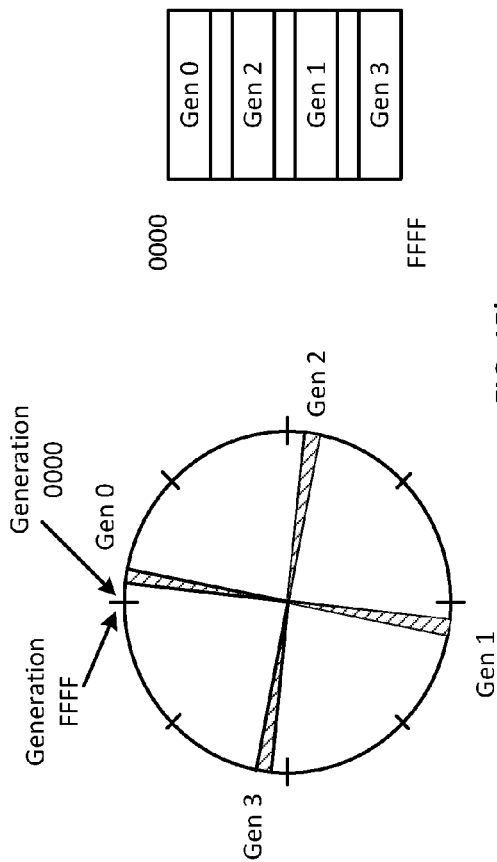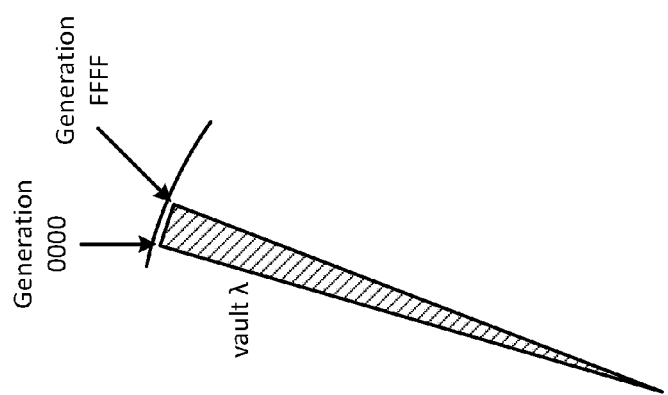
FIG. 15a
FIG. 15b
FIG. 15c

DISPERSED STORAGE NETWORK VIRTUAL ADDRESS GENERATIONS

CROSS REFERENCE TO RELATED PATENTS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 12/764,930, entitled, "Dispersed Storage Network Virtual Address Generations," filed Apr. 21, 2010, which claims priority pursuant to 35 U.S.C. §119(e) to the following U.S. Provisional Patent Application which is hereby incorporated herein by reference in its entirety and made part of the present U.S. Utility patent application for all purposes:
    a. U.S. Provisional Application Ser. No. 61/230,019, entitled "Dispersed Storage Network Virtual Address Space," filed Jul. 30, 2009.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing and more particularly to storage of information.

2. Description of Related Art

Computing systems are known to communicate, process, and store data. Such computing systems range from wireless smart phones to data centers that support millions of web searches, stock trades, or on-line purchases every day. Each type of computing system is constructed, and hence operates, in accordance with one or more communication, processing, and storage standards. With such standards, and with advances in technology, more and more of the global information content is being converted into electronic formats. Electronic content pervasiveness is producing increasing demands on the storage function of computing systems.

A typical computer storage function includes one or more memory devices to match the needs of the various operational aspects of the processing and communication functions. For example, a memory device may include solid-state NAND flash, random access memory (RAM), read only memory (ROM), a mechanical hard disk drive. Each type of memory device has a particular performance range and normalized cost. The computing system architecture optimizes the use of one or more types of memory devices to achieve the desired functional and performance goals of the computing system. Generally, the immediacy of access and power requirements dictates what type of memory device is used. For example, RAM memory can be accessed in any random order with a constant response time, though RAM requires continuous power to store data. By contrast, memory device technologies that require physical movement such as magnetic discs, tapes, and optical discs, have a variable responses time as the physical movement can take longer than the data transfer, but do not require continuous power to store data.

Each type of computer storage system is constructed, and hence operates, in accordance with one or more storage standards. For instance, computer storage systems may operate in accordance with one or more standards including, but not limited to network file system (NFS), flash file system (FFS), disk file system (DFS), small computer system interface (SCSI), internet small computer system interface (iSCSI), file transfer protocol (FTP), and web-based distributed authoring and versioning (WebDAV). An operating systems (OS) and storage standard may specify the data storage format and interface between the processing subsystem and the memory devices. The interface may specify a structure such as directories and files. Typically, a memory controller provides an interface function between the processing function and memory devices. As new storage systems are developed, the memory controller functional requirements may change to adapt to new standards.

However, memory devices may fail, especially those that utilize technologies that require physical movement like a disc drive. For example, it is not uncommon for a disc drive to suffer from bit level corruption on a regular basis, or complete drive failure after an average of three years of use. One common solution is to utilize more costly disc drives that have higher quality internal components. Another solution is to utilize multiple levels of redundant disc drives to abate these issues by replicating the data into two or more copies. One such redundant drive approach is called redundant array of independent discs (RAID). Multiple physical discs comprise an array where parity data is added to the original data before storing across the array. The parity is calculated such that the failure of one or more discs will not result in the loss of the original data. The original data can be reconstructed from the other discs. RAID 5 uses three or more discs to protect data from the failure of any one disc. The parity and redundancy overhead reduces the capacity of what three independent discs can store by one third (n−1=3−2=2 discs of capacity using 3 discs). RAID 6 can recover from a loss of two discs and requires a minimum of four discs with an efficiency of n−2. Typical RAID systems utilize a RAID control to encode and decode the data across the array.

Unfortunately, there are several drawbacks of the RAID approach, including effectiveness, efficiency and security. As more discs are added, the probability of one or two discs failing rises, and is not negligible, especially if less costly discs are used. Thus, the RAID approach has not proved to be effective in maintaining the integrity of the data over time. It is also common to mirror RAID arrays at different physical locations. For example, if the RAID array is part of a national level computing system with occasional site outages, multiple sites may be employed, each containing one or more RAID arrays. However, storing redundant copies at remote locations is not an efficient method for data storage or retrieval. In addition, unauthorized file access becomes a more acute problem when whole copies of the same file are replicated, either on just one storage system site or at two or more sites.

Therefore, a need exists to provide a data storage solution that provides more effective timeless continuity of data, minimizes adverse affects of multiple memory elements failures, provides improved security, can be adapted to a wide variety storage system standards and is compatible with computing and communications systems.

BRIEF DESCRIPTION OF THE SEVERAL VIEWS OF THE DRAWING(S)

FIG. 8 is a diagram of an embodiment of a dispersed storage address table in accordance with the invention;

FIG. 14 is a diagram of another embodiment of a dispersed storage address table in accordance with the invention;

FIG. 15a is a diagram of another embodiment of a dispersed storage address mapping in accordance with the invention;

FIG. 15b is a diagram of another embodiment of a dispersed storage address mapping in accordance with the invention;

FIG. 15c is a diagram of another embodiment of a dispersed storage address mapping in accordance with the invention;

DETAILED DESCRIPTION OF THE INVENTION

Figure 1:
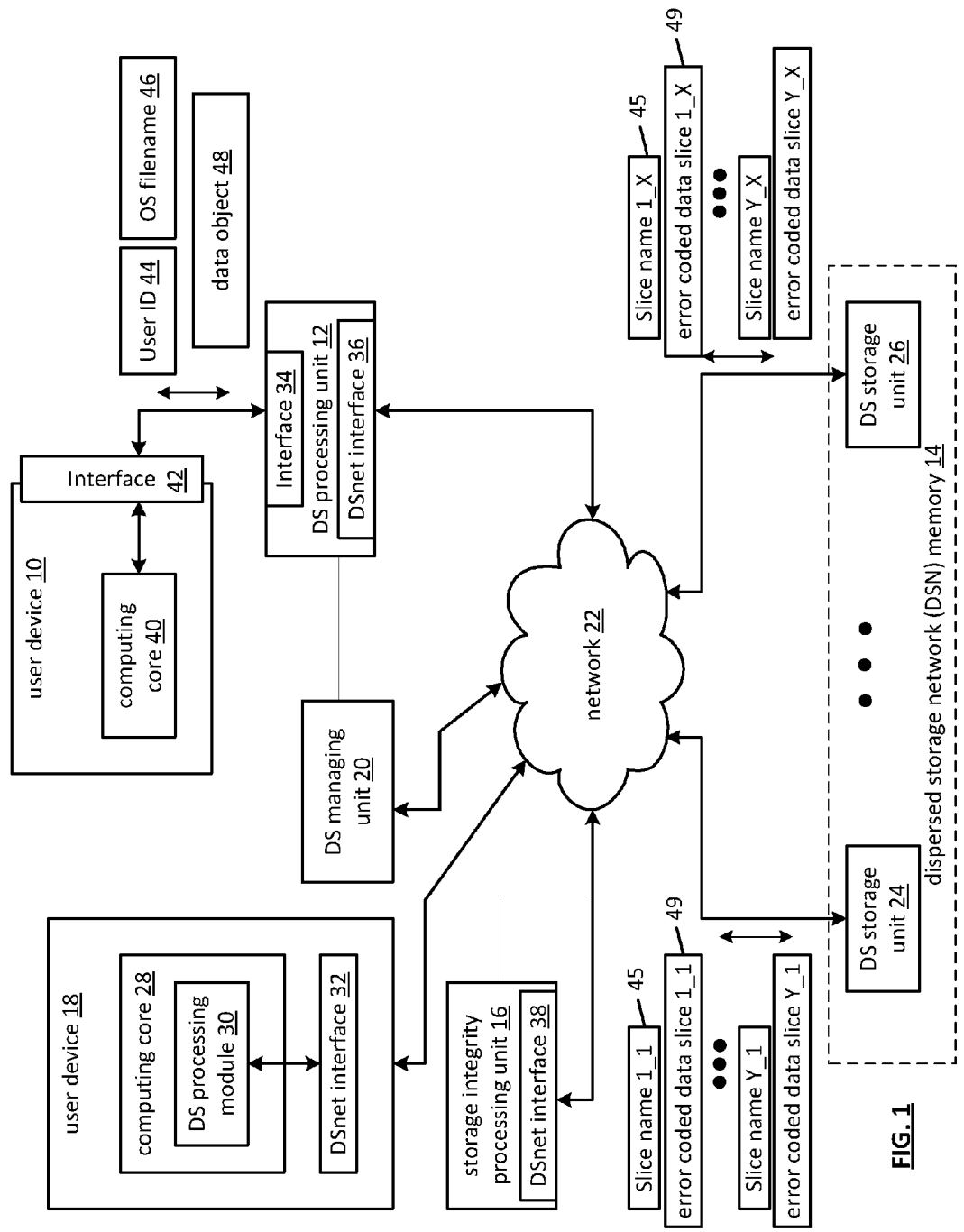
FIG. 1 is a schematic block diagram of an embodiment of a computing system in accordance with the invention.

FIG. 1 is a schematic block diagram of an embodiment of a computing system that includes a first user device 10, a dispersed storage (DS) processing unit 12, a dispersed storage network (DSN) memory 14, a storage integrity processing unit 16, a second user device 18, a DS managing unit 20, and a network 22 providing connectivity between the devices 10, 18 and units 12, 16, 24-26. The DSN memory 14 includes a plurality of dispersed storage (DS) storage units 24-26. The DSN memory 14 may be a subset of the total set of DS storage units 24-26. In an example of operation, data from the user devices 10, 18 is stored to and/or retrieved from the DSN memory 14 as will be described in greater detail below.

The first user device 10 and the second user device 18 may each be a portable device or a fixed device. For example, a portable device may be a cell phone, a smart phone, a personal digital assistant, a digital music player, a digital video player, a laptop computer, a handheld computer, a video game controller, and/or any other portable computing equipment. A fixed device may be a personal computer, a computer server, a cable set-top box, a satellite receiver, a television set, a printer, a fax machine, home entertainment equipment, a video game console, and/or any type of home or office computing equipment.

The DS processing unit 12, one or more of the DS storage units 24-26, the storage integrity processing unit 16, and the DS managing unit 20 each may be a portable device or a fixed device or may be a functional module within another unit that is a portable device or a fixed device. For example, the DS managing unit 20 may be a computer server and the storage integrity processing unit 16 may be a functional module operating on the same computer server as the DS managing unit 20. In another example, the DS processing unit 12 may be a functional module operating on one of the user devices 10 or 18 or DS storage units 24-26.

The network 22 may be a wire lined and/or wireless communication system or system of systems that provide communications capability between the devices 10, 18 and units 12, 16, 24-26. The system of systems may be a combination of private intranets and the public internet. In an example, the DS processing unit 12 has access to the network 22 by way of an optical sub-network and the second user device 18 has access to the network 22 by way of a 4G Long Term Evolution (LTE) wireless network.

In an embodiment, the first user device 10 includes a computing core 40 and an interface 42 to communicate with the DS processing unit 12. The interface 42 accommodates one or more storage system standards such that the first user device 10 can utilize a storage standard native to its operating system. The computing core 40 may include a processing module and other components as will be described in greater detail with reference to FIG. 3.

In an embodiment, the DS processing unit 12 includes an interface 34 to the first user device 10, and a dispersed storage network (DSnet) interface 36 to communicate in a format compatible with the rest of the computing system. For example, the DSnet interface 36 will transmit data to one or more of the DS storage units 24-26 in a format compatible to store the data on the DS storage units 24-26 using a virtual addressing scheme of the DSN memory 14. The virtual addressing scheme of the DSN memory 14 utilizes a virtual address for a data object 48 that is stored to and retrieved from the dispersed storage network. The DSnet interface 36 will be described in greater detail with reference to FIGS. 4 and 9. The interface 34 to the first user device 10 accommodates one or more storage system standards such that the first user device 10, or other user devices, can utilize a storage standard native to their operating system. A user ID 44 and an OS filename or object name 46 are included in the communications where the OS filename 46 is compatible with the OS of the user device 10, 18. The OS filename 46 identifies the data object 48 that is stored to and retrieved from the dispersed storage network.

In an embodiment, the second user device 18 includes a computing core 28 and a DSnet interface 32 to communicate in a format compatible with the rest of the computing system. For example, the DSnet interface 32 will transmit data to one or more of the DS storage units 24-26 in a format compatible to store the data on the DS storage units 24-26. The computing core 28 may include a DS processing module 30 and other components as will be described in greater detail with reference to FIG. 3. The DS processing module 30 will perform a similar function as the DS processing unit 12, thus eliminating the need for an external DS processing unit 12 to the second user device 18. In other words, the DS processing module 30 of the second user device 18 enables the second user device 18 to directly store data to and/or retrieve data from the DSN memory 14 utilizing the virtual addressing scheme of the DSN memory 14.

In an embodiment, the storage integrity processing unit 16 includes a DSnet interface 38 to communicate in a format compatible with the rest of the computing system. For example, the DSnet interface 38 will receive data from one or more of the DS storage units 24-26 in a format compatible to decode the data from the DS storage units 24-26. In an example of operation, the storage integrity processing unit 16 scans the contents of the DSN memory 14 to detect undesired conditions including data corruption, missing data, and offline DS storage units 24-26. The storage integrity processing unit 16 will rebuild a portion of the data in the DSN memory 14 and alert the DS managing unit 20 when undesired conditions are detected. The storage integrity processing unit 16 rebuilds the data by retrieving available data, processing the available data to produce rebuilt data, and storing the rebuilt data in the DSN memory 14.

The DS managing unit 20 functions may include receiving and aggregating network management alarms, alerts, errors, status information, performance information, and messages from any of the modules and units 10, 12, 14, 16, 18, 24-26 of the computing system. For example, the DS processing unit 12 may transmit a simple network management protocol (SNMP) message regarding the status of the DS processing unit 12 via the network 22 to the DS managing unit 20. The DS managing unit 20 functions may also include functions to configure the computing system and perform a billing function for the computing system. For example, the DS managing unit 20 may determine the number of DS storage units 24-26 to configure to meet the operation requirements of a particular user. The configuration may include assignment of DSN memory addresses. In another example, the DS managing unit 20 may track the usage of the DSN memory 14 by the user to create a summary and/or bill. The DS managing unit 20 may also automatically determine optimization of the configuration of the computing system based in part from determining the correlation of past and present configurations with performance. The DS managing unit 20 may share the correlation and configurations with other computing systems managing a different DSN memory to further optimize the computing system.

In an example of operation of the computing system, the computing core 40 of the first user device 10 initiates the sequence to store data to the DSN memory 14 by transmitting the data object 48 via the first user device interface 42 to the DS processing unit interface 34. The data object 48 may include a data file, data blocks, a real time data stream or any other format of digital information. The protocol may include the user ID 44 and the OS filename or object name 46 to mimic a conventional file system interface and may be any one or more of network file system (NFS), flash file system (FFS), disk file system (DFS), small computer system interface (SCSI), internet small computer system interface (iSCSI), file transfer protocol (FTP), and web-based distributed authoring and versioning (WebDAV).

Figure 2:
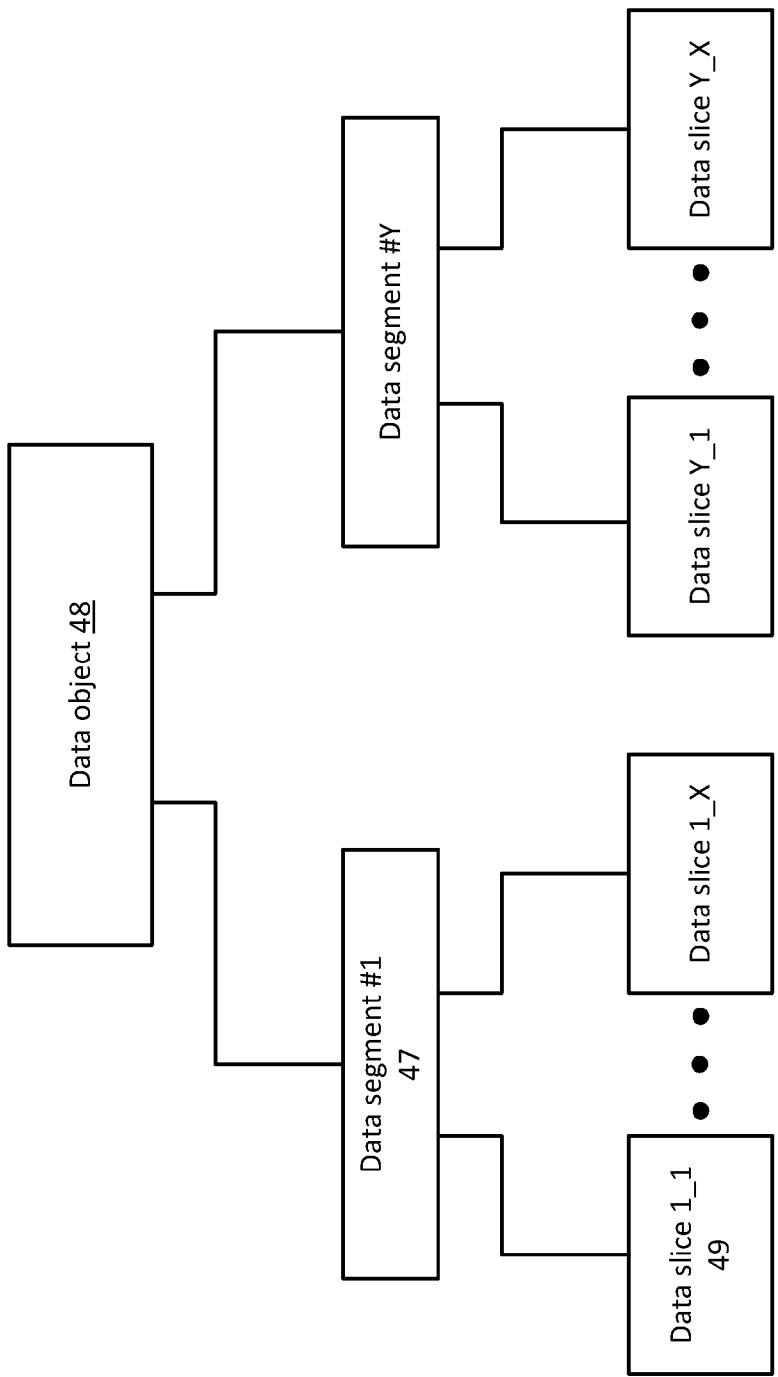
FIG. 2 is a diagram of an embodiment of a dispersed storage data slicing in accordance with the invention.

The DS processing unit 12 receives the data and processes it to create sets of error coded (EC) data slices 49. For example, as shown in FIG. 2, the data, or data object 48, is broken down into Y data segments 47, error coded, and sliced into X (e.g., X=16 slices wide) slices per segment, thus creating XY total error coded data slices 49. The number of slices X per segment is also called the number of pillars and is chosen as a function of the error coding objectives. More specifically, the set of nth slices of all sources in a vault is called a pillar, where a "vault" is associated with one or more users. For example, pillar 3 in a particular vault contains slice 3 of all files written to this particular vault. The size of the data segments 47 is a function of what is chosen for Y and the size of the data object 48. The size of each error coded data slice 49 is a function of the size of the data segment 47 and the error coding algorithm.

Referring again to FIG. 1, the DS processing unit 12 creates a unique slice name 45 for each EC data slice 49 and attaches the slice name 45 to each EC data slice 49. The slice name 45 includes universal DSN memory 14 addressing routing information (i.e., a virtual DSN memory address) and user file information based on the OS filename 46 and user ID 44 to tie the two together. The creation and utilization of the slice name 45 will be described in greater detail with reference to FIGS. 3-17.

The DS processing unit 12 transmits the EC slices 1 through X, and attached slice names, for each data segment via the DSnet interface 36 and network 22 to the DSN memory 14 for storage. The DS storage units 24-26 translate the virtual DSN memory address of the slice name 45 into a local physical address for storage. In an embodiment, each EC slice 49, for the same data segment, is stored on a different DS storage unit 24-26 from all the other slices of that data segment to improve data integrity. The process concludes when the EC slices 49 for the last data segment Y are stored in the DSN memory 14.

In another example of operation of the computing system, the computing core 40 of the second user device 18 initiates a data retrieval sequence by activating the DS processing module 30 to transmit retrieval messages to the DSN memory 14 via the DSnet interface 32 and network 22. The retrieval messages are received by the DS storage units 24-26 that contain the EC data slices 49 generated from the original data object 48 during the storage process. The DS storage units 24-26 read the available EC data slices 49, generated from the original data object 48, from the internal memory devices of the DS storage units 24-26 and transmit the EC slices 49 via the network 22 and DSnet interface 32 of the second user device 18 to the DS processing module 30. The DS processing module 30 decodes the EC slices 49 in accordance with an information dispersal algorithm (IDA) to produce the original data object 48.

The above example retrieval sequence would be similar if the first user device 10 initiates the retrieval request. In such an example, the computing core 40 of the first user device 10 requests the data object 48 retrieval using a standard memory access protocol associated with the OS of the first user device 10 utilizing the OS filename 46. The DS processing unit 12 performs the same tasks as in the above described example to retrieve the EC slices from the appropriate DS storage units 24-26 to reconstruct the data object 48 and provide it to the first user device 10 via the interfaces 34 and 42 to the computing core 40 of the first user device 10.

Figure 3:
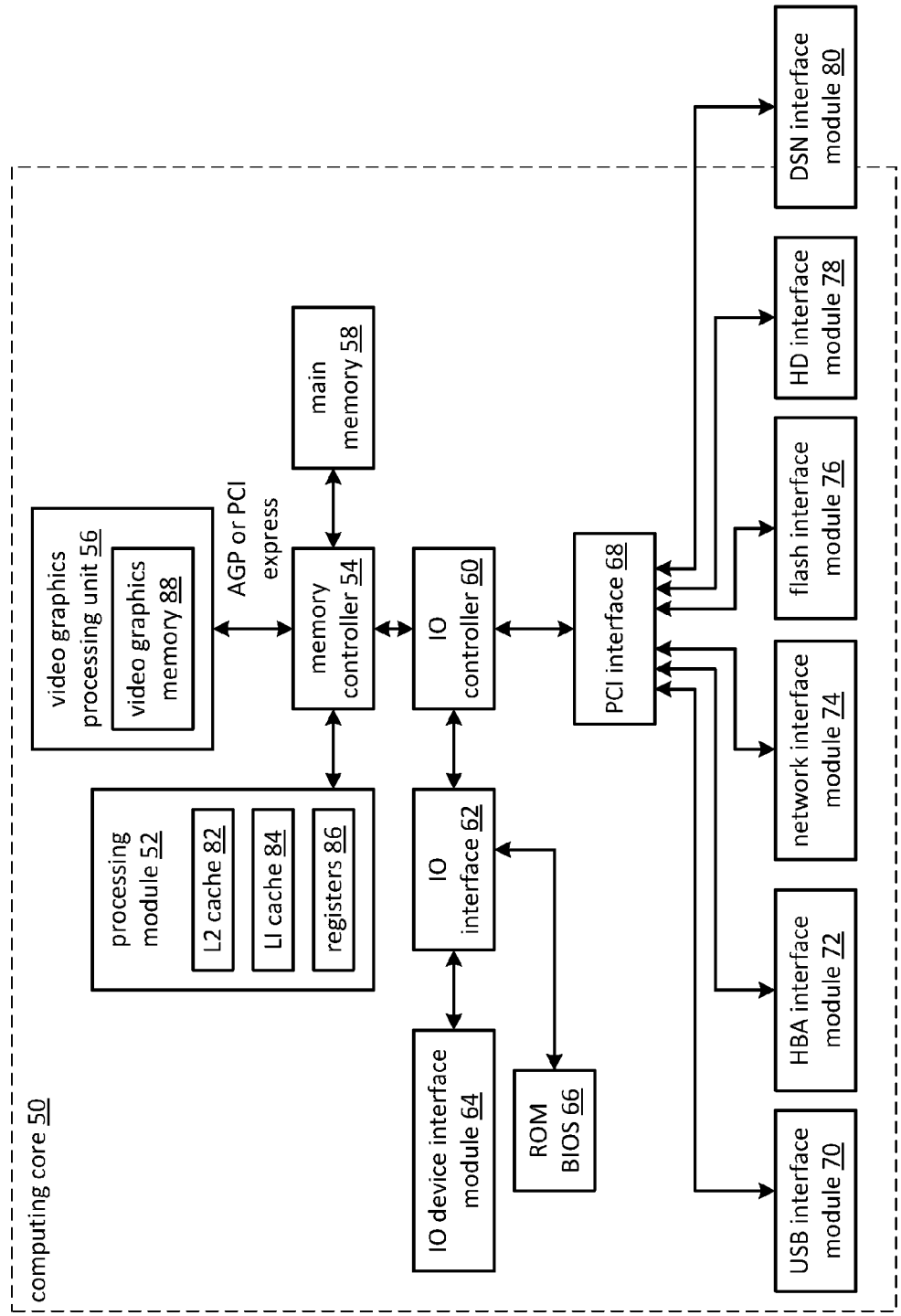
FIG. 3 is a schematic block diagram of an embodiment of a computing core in accordance with the invention.

FIG. 3 is a schematic block diagram of an embodiment of a computing core 50 that includes a processing module 52, a memory controller 54, a video graphics processing unit 56, a main memory 58, an input output (TO) controller 60, an input output (TO) interface 62, an input output (TO) device interface module 64, a read only memory basic input output system (ROM BIOS) 66, a peripheral component interconnect (PCI) interface 68, a universal serial bus (USB) interface module 70, a host bus adapter (HBA) interface module 72, a network interface module 74, a flash interface module 76, a hard drive interface module 78, and a DSN interface module 80.

The computing core 50 may be included in the user devices, the DS processing unit, the DS storage unit, the storage integrity processing unit, the DS managing unit, and/or any other device or unit that is part of or coupled to the computing system of FIG. 1. Some computing core elements may be external to the computing core 50. For example, the video graphics processing unit 56 may be a separate computer card with specialty integrated circuits to render display images. The video graphics processing unit 56 may interface to the computing core 50 utilizing a standard such as accelerated graphics port (AGP) or peripheral component interconnect express (PCIe).

The DSN interface module 80 function may be all or partially a part of the computing core 50. For example, a portion of the DSN memory interface module 80 function may be part of the computing core 50 of the user device and part of the computing core 50 of the DS processing unit of FIG. 1.

Computing core 50 modules, interfaces, and controllers 52-80 may each include one or more integrated circuits to perform their function alone or in combination with executable computer instructions. The executable computer instructions may be programmed into the integrated circuit or loaded into a memory associated with the computing core 50 for execution by the processing module 52. For example, the ROM BIOS 66 may contain executable computer instructions that are loaded into the main memory 58 and executed by the processing module 52 upon initial start of the computing core 50.

In an embodiment, the processing module 52 is the primary processor for the computing core 50 coordinating a majority of tasks (e.g., execute one or more operation instructions of an algorithm, perform an interrupt, perform a co-processing function, process data, store data to memory, read data from memory, etc.) and includes at least one L2 cache 82, at least one L1 cache 84, and registers 86. The memory controller 54 coordinates the reading of data and writing of data within the core processing unit. For example, data for display renderings may be routed to and from the video graphics processing unit 56 while data for routine operations may be routed to and from the main memory 58. The video graphics processing unit 56 may include a video graphics memory 88.

The IO controller 60 provides access to the memory controller 54 for typically slower devices. In an embodiment, the IO controller 60, via the PCI interface 68, provides functionality between the memory controller 54 and the DSN memory utilizing an electrical connection and a protocol standard. For example, a local area network (LAN) and/or wide area network (WAN) may interface with the network interface module 80 utilizing a network file system (NFS) standard. A flash memory may interface with the flash interface module 76 utilizing a flash file system (FFS) standard. A hard drive may interface with the HD interface module 78 utilizing a disk file system (DFS). The DSN memory may interface with the DSN interface module 80 utilizing a series of standards including NFS, FFS, DFS, and more. For example, the DSN interface module of the first user device of FIG. 1 may utilize NFS to communicate data objects to/from the DSN memory. In another example, the DSN interface module of the second user device of FIG. 1 may communicate error coded data slices to/from the DSN memory.

Portions of the interface modules 70-80 may have capabilities such that they can be directly coupled to the IO controller 60 or directly to the memory controller 54. For example, the DSN interface module 80 may be directly coupled to the memory controller 54.

The IO interface 62 couples the memory controller 54, via the IO controller 60, to other computing core elements including the ROM BIOS 66 and the IO device interface module 64. The IO device interface module 64 may provide the interface for a variety of IO devices including a keyboard, a mouse, a printer, a removable CD/DVD disk drive, and/or any other IO device.

In an example of operation, the processing module 52 retrieves data (e.g., a media file) from the main memory 58 routing it through the memory controller 54, the IO controller 60, the PCI interface 68, and the DSN interface module 80 to the DSN memory for storage.

Figure 4:
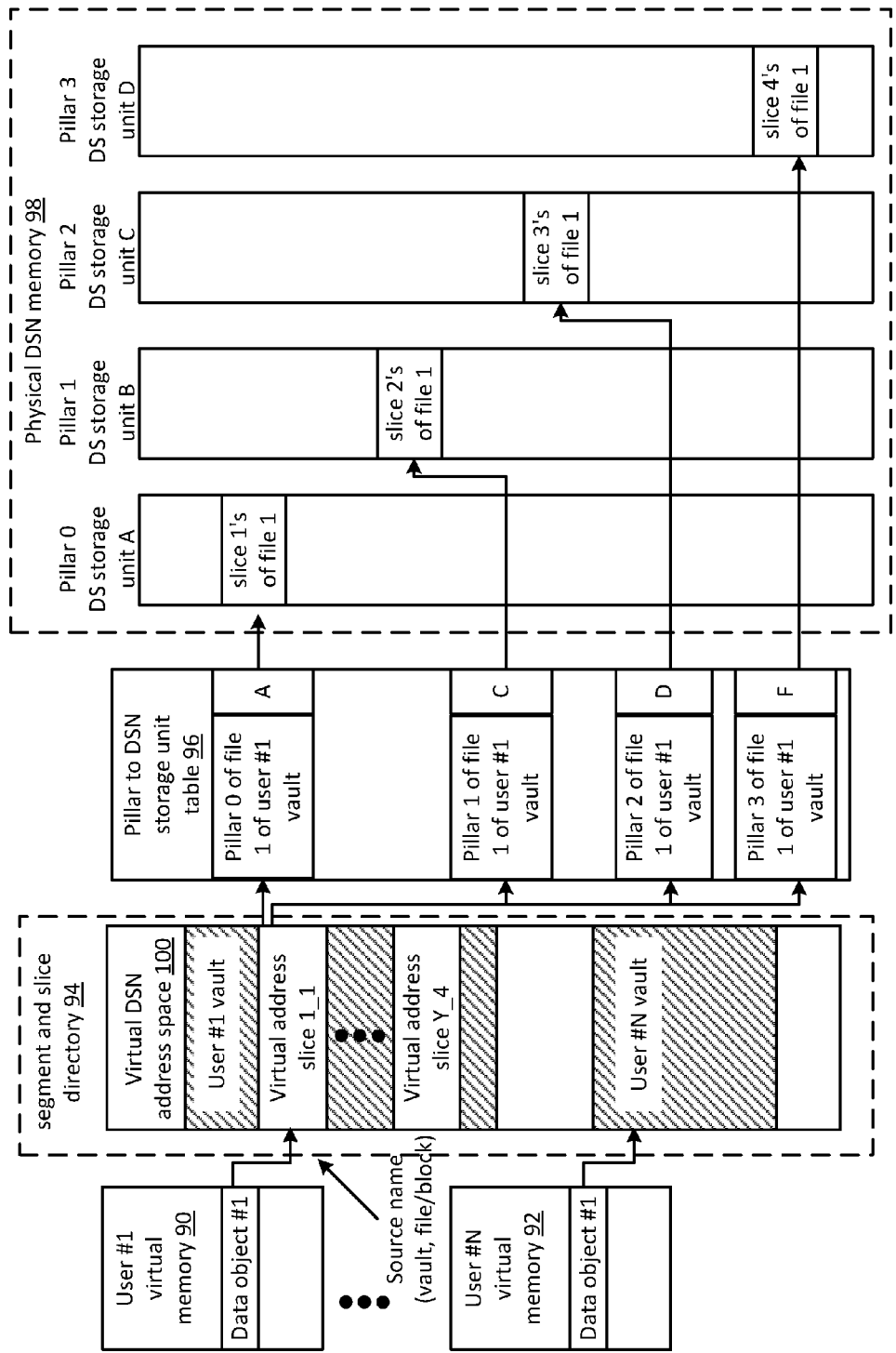
FIG. 4 is a schematic block diagram of an embodiment of a file system hierarchy in accordance with the invention.

FIG. 4 is a schematic block diagram of an embodiment of a file system hierarchy including a plurality of user virtual memories 90-92, a Segment and Slice directory 94, a Pillar to DSN Storage Unit table 96, and a Physical DSN memory 98. The Segment and Slice directory 94 comprises a Virtual DSN address space 100, while the physical DSN memory 98 includes a plurality of DS storage units A-D. The Segment and Slice directory 94 and Pillar to DSN Storage Unit table 96 may be implemented within, for example, the DS processing unit and/or DS processing module of FIG. 1. The file system hierarchy may be utilized to translate the user virtual memory 90-92 to the Physical DSN memory 98 by translating a data object associated with a user into the virtual DSN address space 100 and then to the Physical DSN memory 98.

Each user is associated with one or more vaults and each vault is associated with one or more users. The vault may contain per vault and/or per source of the vault, user attributes (e.g., user identification, billing data, etc.), operational parameters, a list of the DS storage units that will be utilized to support the vault and a list of virtual memory addresses within the Virtual DSN address space 100 assigned to the vault. One or more vaults may be established from the same set of DS storage units in different combinations. For example, User #1's vault can utilize DS storage units A, B, C and D, while User #N's vault can utilize DS storage units A, C and D. A vault identifier is utilized to distinguish between vaults. A vault has a predetermined number of pillars for each data object. For example, User #1 has a vault identified operational parameter of four pillars (Pillars 0-3).

Although pillars can be allocated to more than one DS storage unit, in one embodiment, a given DS storage unit is not assigned to store more than one pillar from a given vault to improve system robustness. Therefore, within the Pillar to DSN Storage Unit table 96, each Pillar (0-3) is assigned to a different DS storage unit (A-D), respectively. However, in other embodiments, instead of assigning pillars to different DS storage units (A-D), the Pillar to DSN Storage Unit table 96 can indicate that a given DS storage unit will only store one slice of any given source, but may store multiple slices from the same pillar. For example, DS Storage Unit A may store pillar 1 of sources 51-100 and pillar 2 of sources 0-50. As such, the DSN to Storage Unit table 96 may allow arbitrary name range mappings rather than requiring alignment on pillar boundaries. The vault can be maintained by, for example, the DS managing unit of FIG. 1 and can be used to populate the Segment and Slice directory 94 and Pillar to DSN storage unit table 96.

In an embodiment, one of the plurality of users (i.e., User #1) utilizes a native OS file system to access User #1's virtual memory 90 by including source name information (i.e., a file/block name identifying a data object and a vault identifier associated with the user) in any request such as read, write, delete, list, etc. The source name vault identifier and file/block name will index into the Segment and Slice directory 94 to determine the Virtual DSN address space 100 assigned to that data object. For example, each data slice of the data object is assigned a unique virtual DSN address within the Virtual DSN address space 100 allocated to User #1's vault.

In an example embodiment, the total virtual DSN address space 100 is defined by a forty eight byte identifier thus creating $256^{48}$ possible slice names. The virtual DSN address space 100 accommodates addressing all EC (error coded) data slices of every data segment of every data object (e.g., data file, blocks, streams) of every user vault. The slice name is a virtual DSN address and remains the same even as different DS storage units are added or deleted from the physical DSN memory 98.

As described above, a user has a range of virtual DSN address assigned to their vault. In one embodiment, the virtual DSN addresses typically do not change over the operational lifespan of the system for that particular user. In another embodiment, the virtual DSN address space 100 is dynamically altered from time to time to provide potential benefits including improved security and expansion, or retraction, capability. A virtual DSN address space security algorithm may alter the virtual DSN address space 100 according to one or more of a command (e.g., from the DS managing unit), a schedule, a detected security breach, or any other trigger. The virtual DSN address may also be encrypted in use thus requiring encryption and decryption steps whenever the virtual DSN address is used.

The index into the virtual DSN address space 100 by vault and file name will create the slice names (virtual DSN addresses) to use as an index into the Pillar to DSN Storage Unit table 96. In an embodiment, the Pillar to DSN Storage Unit table 96 is sorted by vaults and pillars so that the subsequent addresses are organized by pillar of all the file segments that have EC data slices with the same slice identifier and hence are typically stored at the same DS storage unit. The output of the access to the Pillar to DSN Storage Unit table 96 is the DS storage unit identifiers.

The slice names will be used as the virtual index to the memory system of each DS storage unit to gain access the physical address of the EC data slices. In an embodiment, the DS storage unit maintains a local table (not shown) correlating slice names (virtual DSN address) to the addresses of the physical media internal to the DS storage unit.

In the example shown in FIG. 4, User #1 has a vault identified operational parameter of four pillars, and as such, there are four data slices created for each data segment of the Y segments. Pillar 0 is mapped to DS storage unit A, pillar 1 is mapped to DS storage unit B, pillar 2 is mapped to DS storage unit C, and pillar 3 is mapped to DS storage unit D.

Figure 5:
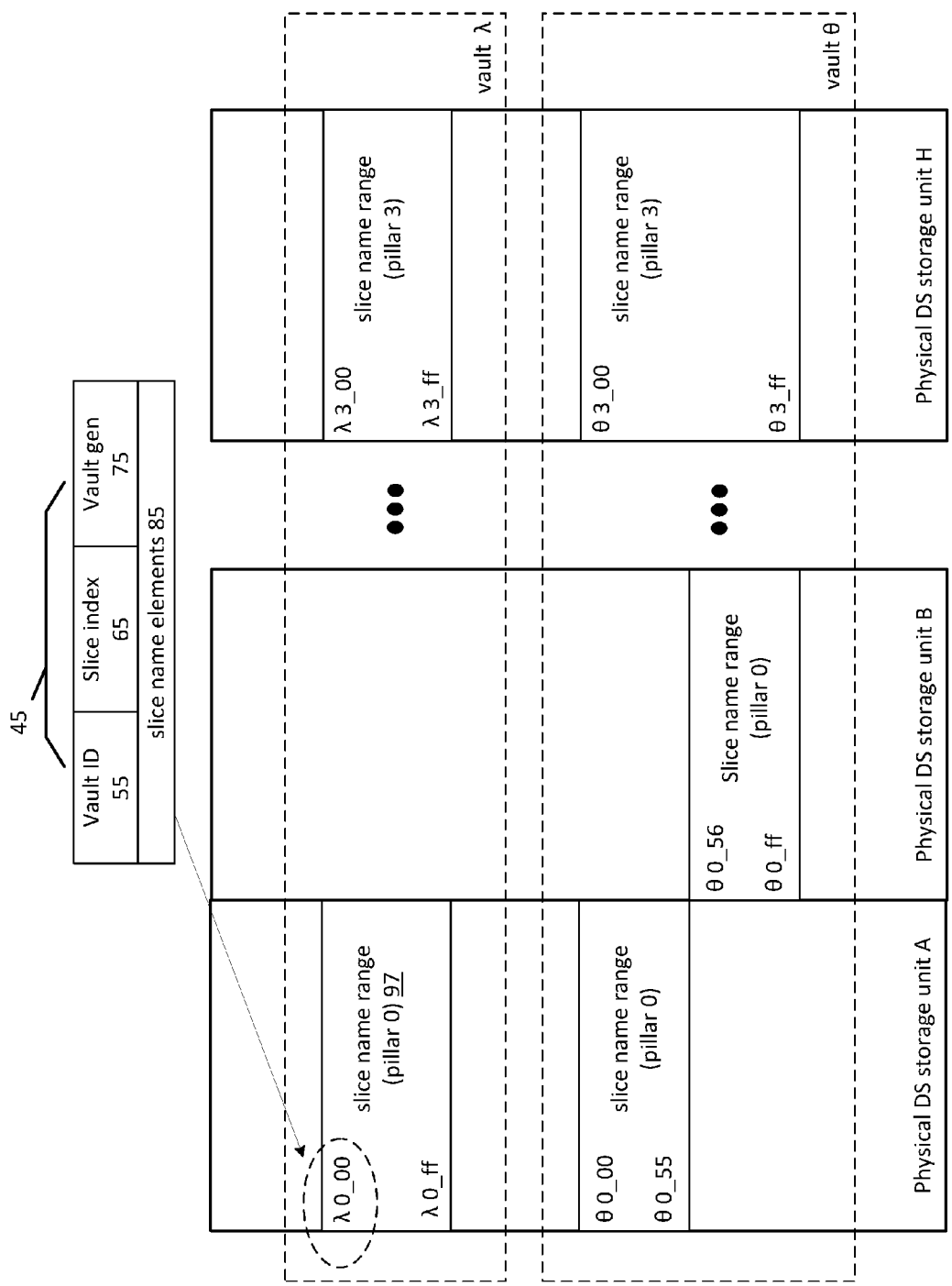
FIG. 5 is a diagram of an embodiment of a dispersed storage memory mapping in accordance with the invention.

FIG. 5 is a diagram of an embodiment of a dispersed storage memory mapping including slice name ranges 97 that are mapped to particular DS storage unit identifiers. This mapping indicates the Pillar to DSN Storage Unit table of FIG. 4. Each range 97 has a common slice identifier, hence that range is consistent with a single pillar. To provide desired error resiliency, the same pillar may utilize one or more DS storage units, but at most one pillar (of a given vault) will utilize the same DS storage unit. In other words, pillars of the same vault utilize different DS storage units. In an example, pillar 0 of vault $\lambda$ utilizes DS storage unit A and pillar 3 of vault $\lambda$ utilizes DS storage unit H. In another example, pillar 0 of vault $\theta$ utilizes DS storage units A and B while pillar 3 of vault $\theta$ utilizes DS storage unit H.

The slice name range 97 is derived from common slice identifiers determined from the slice name 45. The common slice identifiers from the slice name 45 include the vault identifier 55, the slice index 65 and the vault generation number 75 (which indicates a particular generation of a vault, as described in more detail below in connection with FIGS. 14-17). In general, a new generation for a vault is established in order to provide additional storage capacity for a particular user. Other elements 85 of the slice name 45 that do not indicate a particular pillar, but rather a particular data slice, include the file name/block identifier and the data segment number. Slice index numbers on the boundaries of a split between two or more DS storage units may be random or chosen to meet a split criteria. For example, the split criteria may force the boundaries to be between file numbers, segment numbers of the same file number, generations of the same file, or other (e.g., reserved bits, flags, future expansion).

In an example, the slice name field comprises forty-eight bytes including sixteen bytes for the vault identifier 55, two bytes for the slice index 65, two bytes for the vault generation number 75, two bytes for a type identifier (e.g., file or block), sixteen bytes for a file identifier number (or fourteen bytes of zeros when blocks are used), four bytes for a reserved field, and six bytes for the data segment number. In one embodiment, slice names for pillars are specified in ranges rather than byte by byte. The slice name ranges may be broken up into any number of ranges where the number of ranges is less than the number of permutations of the address space of the other elements.

Figure 6A:
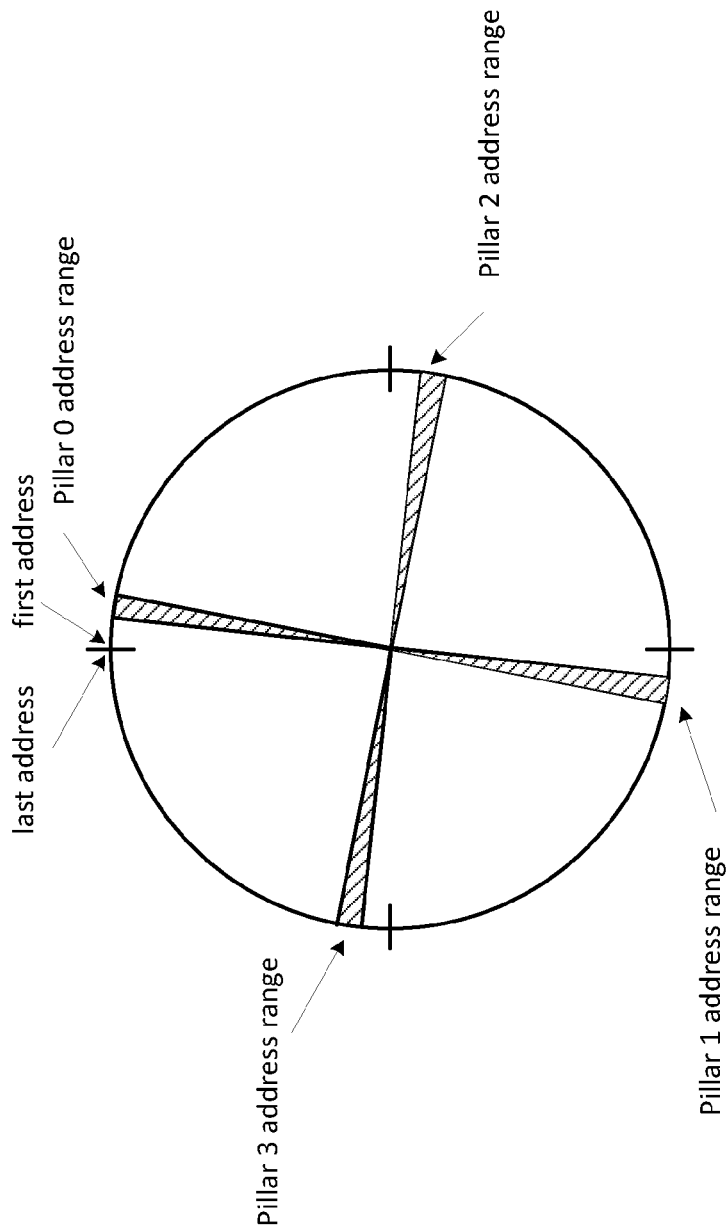
FIG. 6a is a diagram of an embodiment of a dispersed storage address mapping in accordance with the invention.

FIG. 6a is a diagram of an embodiment of a dispersed storage address mapping that includes a circular address sequence that begins and ends at the top with a first DSN address (e.g., 0) and a last DSN address (e.g., $256^{48}$). The circular view of the entire DSN address range facilitates observation of the distancing relationships between the assigned address ranges, such as pillars of a particular vault. In an example, a four pillar assignment with equal distance between pillar address ranges forms a pinwheel shape in the diagram. Equally spacing the pillar address ranges apart provides an ability to expand each portion in a commensurate way while simplifying the determination of the address ranges of each pillar.

Within a pillar range, the most significant bits of the DSN address are held constant, including the slice index, the vault identifier, and the vault generation. Within a pillar range, the DSN address sequences through the addresses to specify vault specific information including the file identifier or block identifier. The fields of the address ranges will be described in greater detail with reference to FIGS. 8 and 11.

DS storage units are assigned pieces or all of the address range of a single pillar. Multiple DS storage units may be assigned one pillar. DS storage units serving the same pillar may be co-located at one site to better facilitate load balancing without utilizing network bandwidth. DS storage units may or may not be assigned to more than one pillar.

Adding vault generations may serve to expand the address range of a vault. Generations are discrete pools of storage that can be added to an existing vault to increase its capacity. For example, the address range for a first generation may be assigned to one DS storage unit and the address range for a second generation may be assigned to another DS storage unit. Such partitioning facilitates expansion without requiring file transfers between DS storage units to balance the load. The assignment and use of generations will be described in greater detail with reference to FIGS. 14-17.

Figure 6B:
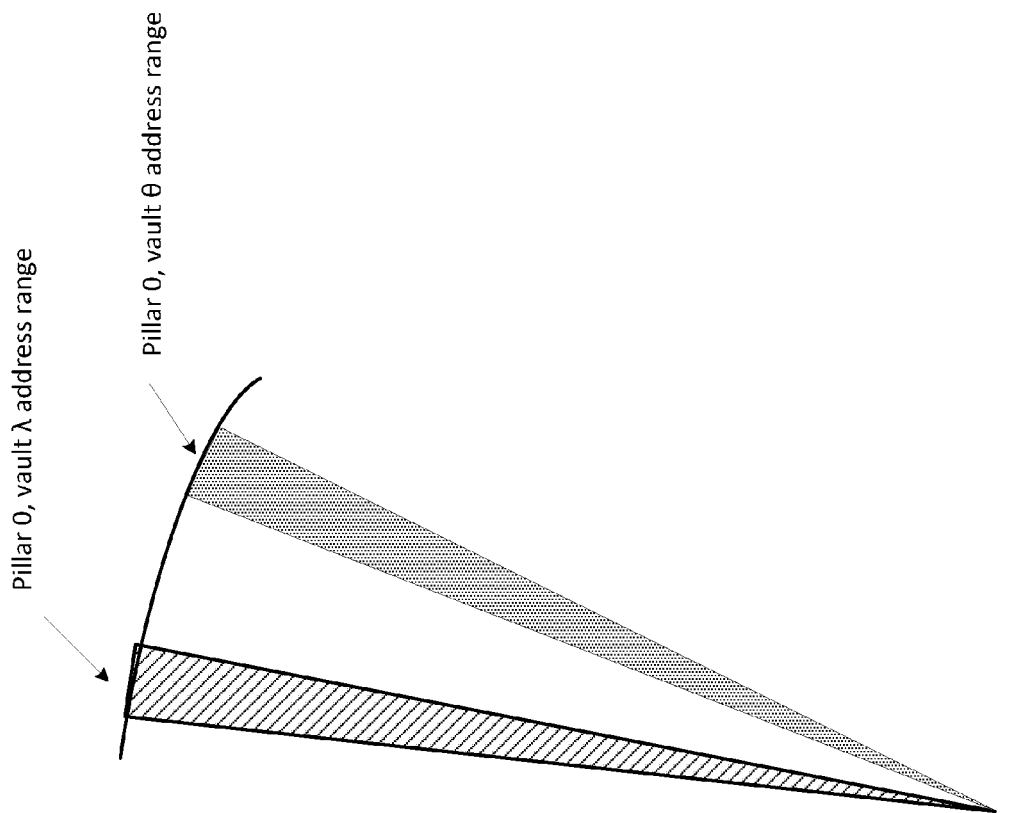
FIG. 6b is a diagram of another embodiment of a dispersed storage address mapping in accordance with the invention.

FIG. 6*b* is a diagram of another embodiment of a dispersed storage address mapping that includes a close-in examination of one section of the DSN address circle of FIG. 6*a*. In an example, vault λ has a pillar 0 DSN address range very close to the vault θ pillar 0 DSN address range. Similar pillar numbers will be located near each other on the circular DSN address circle since the slice index is the most significant part of the DSN address and the slice index is derived from the pillar number. A single DS storage unit may be assigned to the same pillar number of two or more vaults. The determination of the slice index will be described in greater detail with reference to FIGS. 8-10.

Figure 6C:
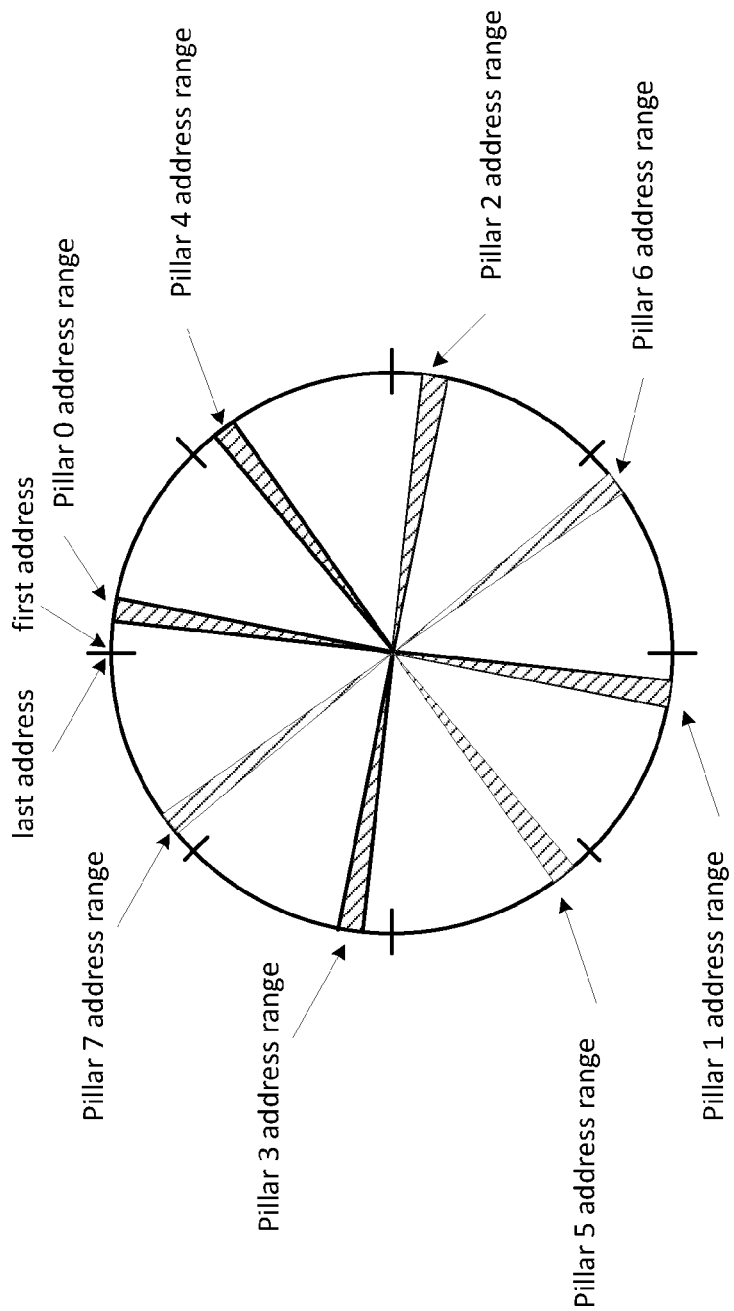
FIG. 6c is a diagram of another embodiment of a dispersed storage address mapping in accordance with the invention.

FIG. 6*c* is a diagram of another embodiment of a dispersed storage address mapping includes a circular address sequence that begins and ends at the top with a first DSN address (e.g., 0) and a last DSN address (e.g., $256^{48}$). The circular view of the entire DSN address range facilitates observation of the distancing relationships between the assigned address ranges, such as pillars of a particular vault. In an example, an eight pillar assignment with equal distance between pillar address ranges forms a pinwheel shape in the diagram. Adding more pillars splits the space between the ranges. Equally spacing the pillar address ranges apart provides an ability to expand each portion in a commensurate way while simplifying the determination of the address ranges of each pillar.

Within a pillar range, the most significant bits of the DSN address are held constant, including the slice index, the vault identifier, and the vault generation. Within a pillar range, the DSN address sequences through the addresses to specify vault specific information including the file identifier or block identifier. The fields of the address ranges will be described in greater detail with reference to FIGS. 8 and 11.

DS storage units are assigned pieces or all of the address range of a single pillar. Multiple DS storage units may be assigned one pillar. DS storage units serving the same pillar may be co-located at one site to better facilitate load balancing without utilizing network bandwidth. DS storage units may or may not be assigned to more than one pillar.

Figure 7:
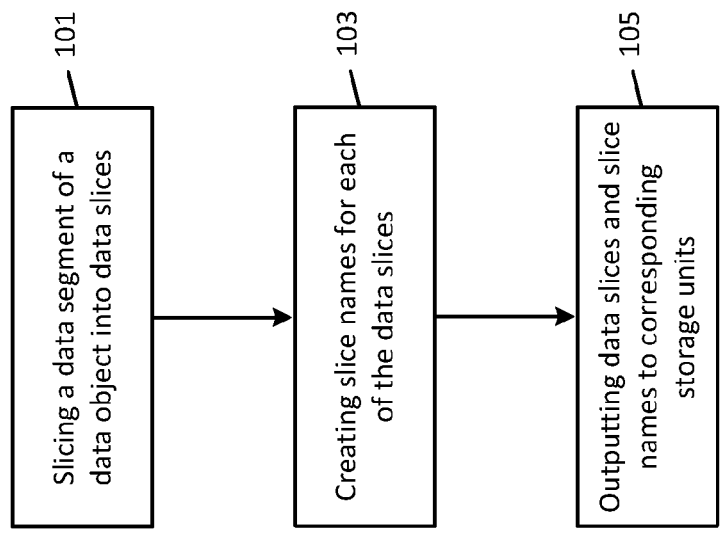
FIG. 7 is a logic diagram of an embodiment of a method for storage of a data object within a dispersed storage network (DSN) in accordance with the present invention.

FIG. 7 is a logic diagram of an embodiment of a method for storage of a data object within a dispersed storage network (DSN) that starts with the step of slicing a data segment of a data object into data slices 101. The slicing may be made by the processing module of the DS processing unit or of a user device.

The processing module next creates a slice name for each data slice 103. The slice name includes an identifier of the data object and a virtual memory address of a virtual memory associated with the dispersed storage network. For example, the slice name can include a file name/block identifier that identifies the data object and vault, data segment and slice information that provide the virtual memory address. The slice names will be used as the virtual index to the memory system of each DS storage unit to gain access the physical address of the EC data slices.

The processing module next outputs each of the data slices and the respective slice names to a corresponding storage unit for storage of the data slices therein 105. In an embodiment, each data slice, for that data segment, is stored on a different DS storage unit from all the other slices of that data segment to improve data integrity. The DS storage units maintain respective local tables correlating slice names (virtual DSN address) to the addresses of the physical media internal to the DS storage unit.

FIG. 8 is a diagram of an embodiment of a dispersed storage address table for the slice name 45 that includes routing information 91 unique across the entire DSN and vault specific information 93 that contains vault specific source data name 95 that is unique to the vault user and may be reused between vaults (e.g., the same file identifiers may be used in different vaults). The vault specific source data name 95 may include file and segment identifiers or block identifiers 97 that identify the data object to be stored. The vault specific information fields 97 will be further discussed with reference to FIG. 11.

The routing information field 91 may contain the slice index 65, the vault identifier 55, the vault generation 75, and the reserved field 99. In an embodiment the slice index 65 may be two bytes, the vault identifier 55 may be sixteen bytes, the vault generation 75 may be two bytes, and the reserved field 99 may be four bytes.

In an example, the user vault specifies that four pillars are used. The slice index field is based on the vault ID and pillar ID such that the very most significant bits sequence from 00 to 11 to provide the evenly distributed DSN address ranges illustrated in FIG. 5. The determination of the slice index will be further discussed with reference to FIG. 10.

The vault identifier may be a sixteen byte universally unique identifier (UUI). A given vault identifier is uniquely associated with one user on the entire DSN and the vault identifier can be randomly assigned (but constantly associated with the same user) by the DS processing unit, the DS managing unit, the storage integrity processing unit, and/or the DS storage unit.

The vault generation may extend the address block for a given vault and facilitate a simplified expansion process. The vault generation may be assigned by the DS processing unit, the DS managing unit, the storage integrity processing unit, and/or the DS storage unit as will be discussed further with reference to FIGS. 14-17.

Figure 9:
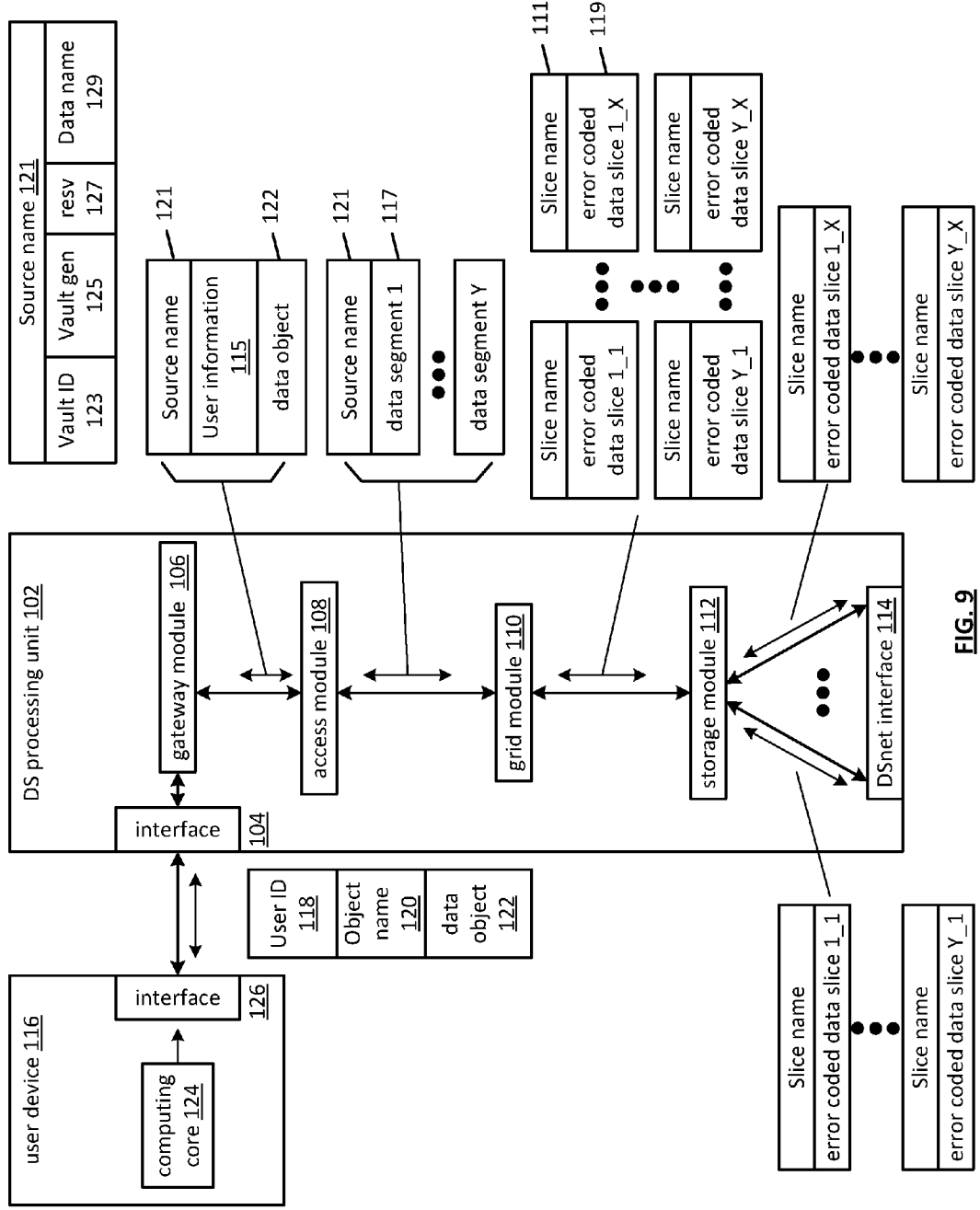
FIG. 9 is a schematic block diagram of an embodiment of a dispersed storage processing unit in accordance with the invention.

FIG. 9 is a schematic block diagram of an embodiment of a dispersed storage (DS) processing unit 102 that includes an interface 104, a gateway module 106, an access module 108, a grid module 110, a storage module 112, and the DSnet interface 114. In another embodiment, one or more of the gateway module 106, the access module 108, the grid module 110, and the storage module 112 may be implemented outside of the DS processing unit 102. The DS processing unit 102 functions includes the transformation of incoming data objects 122 (e.g., files, blocks, streams) from a user device 116 via the interface 104 into error coded (EC) data slices, with attached slice names, which the DS processing unit 102 stores in the DSN memory via the DSnet interface 114. The DS processing unit 102 retrieves EC data slices, with attached slice names, from the DSN memory and transforms the EC data slices into data objects, which the DS processing unit 102 communicates to the user device 116 via the interface 104.

The interface 104 of the DS processing unit 102 is coupled to the interface 126 of the user device 116. The interfaces 104, 126 may be logical if the DS processing unit 102 is part of the second user device. The interfaces 104, 126 collectively form a DSN memory interface to accommodate the OS file system of the user device such that, from the perspective of the user device 116, data objects 122 may be stored to and retrieved from the DS processing unit 102 as if the DS processing unit 102 were any other compatible storage system. For example, the interface may receive the data object 122, a user identifier 118 of the user and an object name 120 (file name of the data object in the OS of the user) from interface 126 for storage of the data object.

The gateway module 106 couples the interface 104 to the access module 108 and may include functions to act as a portal between the user device 116 and the DS processing unit 102 allowing them to communicate between protocols providing computing system interoperability. The gateway module 106 converts protocols and messages as a function of the user device 1160S file system. For example, the gateway module 106 converts a retrieve-file message in the NFS protocol format from the first user device 116 to a dispersed storage network message in the dispersed storage network protocol to trigger the DS processing unit 102 to retrieve the data and return it to the first user device 116. The gateway module 106 may include other functions including access control to prevent unauthorized use, user identification, user information retrieval, traffic monitoring, statistics generation, DS processing unit configuration, and DS processing unit management. The gateway module 106 may provide user access authentication to verify a user has permissions to perform one or more DSN memory access functions including write, read, delete, list, status, configure, and/or other functions that access the DSN memory.

The gateway module 106 may access user information 115 based on the user identification 118. The gateway module 106 receives the user identifier 118 and looks up the vault identifier. Each vault is associated with each user, and as described above, may contain user information 115, such as user attributes (e.g., who it is, billing data, etc.) and operational parameters. The operational parameters may include one or more of the error coding algorithm, the width X (number of pillars or slices per segment for this vault), the threshold T (described below), the encryption algorithm, a slicing parameter, a compression algorithm, an integrity check method, caching settings, parallelism settings, and/or other parameters that may be used to access the DSN memory. The gateway module 106 may access user information 115 from the vault associated with the user from any one or more sources including the DS managing unit, the user device 116, the DSN memory, and/or a source external to the computing network.

The gateway module 106 may also determine a source name 121 to associate with the data object 122. The source name 121 may contain a data name 129 (block number or a file number) that is associated with the data object name 120, the vault generation number 125, the reserved field 127, and the vault identifier 123. The data name 129 may be randomly assigned but it is always associated with the user data object 122 (object name 120). The gateway module 106 may pass the user information 115, source name 121, and data object 122 to other elements of the DS processing unit 102 to assist in the operation as will be described in greater detail with reference to FIGS. 10-17.

In an embodiment, the access module 108 communicates data objects 122, user information 115, and the source name 121 with the gateway module 106, and data segments 117, user information 115, and the source name 121 with the grid module 110. The access module 108 creates a series of data segments 1 through Y from the data object 122 to be stored. In one embodiment, the number of segments Y is chosen (e.g., part of the user information) to be a fixed number for a given user vault, but the size of the segments varies as a function of the size of the data object 122. For instance, if the data object 122 is an image file of 4,194,304 eight bit bytes (e.g., 33,554,432 bits) and the number of segments Y=131,072, then each segment is 256 bits or 32 bytes. In another embodiment, the number of segments Y is a variable number based on the size of each data file with the objective to have a constant size of the data segments (e.g., data segment size is specified in the user information). For instance, if the data object 122 is an image file of 4,194,304 bytes and the fixed size of each segment is 4,096 bytes, the then number of segments Y=1,024.

The access module 108 may include the source name 121 in each the data segment 117 before passing the data segment 117 to the grid module 110. The grid module 110 may pre-manipulate (e.g., compression, encryption, cyclic redundancy check (CRC), etc.) the data segment 117 before creating X error coded data slices 119 for each data segment 117. The grid module 110 creates XY error coded data slices 119 for the Y data segments of the data object 122. The grid module 110 adds forward error correction bits to the data segment bits in accordance with an error coding algorithm (e.g., Reed-Solomon, Convolution encoding, Trellis encoding, etc.) to produce an encoded data segment. The grid module 110 determines the slice name 111 and attaches the unique slice name 111 to each EC data slice 119.

The number of pillars, or slices X per data segment (e.g., X=16) is chosen as a function of the error coding objectives. A read threshold T (e.g., T=10) of the error coding algorithm is the minimum number of error-free error coded data slices required to be able to reconstruct a data segment. The DS processing unit 102 can compensate for X−T (e.g., 16−10=6) missing error coded data slices per data segment.

The grid module 110 slices the encoded data segment 117 to produce the error coded data slices 119. The slicing complements the error coding algorithm and accommodates the nature of dispersing error coded data slices to different DS storage units of the DSN memory. The grid module 110 may use interleaving to slice the encoded data segment such that if an entire error coded slice is lost it will not destroy a large contiguous portion of the data segment preventing reconstruction.

The size of each error coded data slice is a function of the size of the data segment and the error coding algorithm. In an embodiment, the size of each error coded data slice is the size of the data segment divided by the threshold T. For example, if the data segment is 32 bytes and the threshold is 10, then each error coded slice (without any addressing) is about 4 bytes.

The grid module 110 may perform post-data manipulation on the error coded data slices where the manipulation may include one or more of slice level compression, encryption, CRC, addressing, tagging, and/or other manipulation to improve the effectiveness of the computing system.

The grid module 110 may determine which DS storage units to store each error coded data slice based in part on a dispersed storage memory mapping associated with the user's vault as was described in with reference to FIGS. 3-4. The location determination may also be based in part on DS storage unit attributes including one or more of availability, self-selection, performance history, link speed, link latency, ownership, available memory, domain, cost, and more generally on one or more of a prioritization scheme, a centralized selection message from another source, a lookup table, who owns the data, and/or any other factor to optimize the operation of the computing system. The grid module 110 will pass the DS storage unit determinations on to the storage module 112 so that the storage module 112 can direct the EC data slices properly.

In an embodiment, the number of DS storage units is equal to or greater than the number of pillars (slices X per segment)

so that no more than one error coded data slice of the same data segment is stored on the same DS storage unit. Error coded data slices of the same slice number but of different segments (e.g., EC data slice 1 of data segment 1 and EC data slice 1 of data segment 2) may be stored on the same or different DS storage units.

The grid module 110 will pass the EC coded data slices 119 (including the slice names 111) with DS storage unit determinations (e.g., the DS storage unit numbers) to the storage module 112. The storage module 112 may perform integrity checks on the EC data slices and then transmit the EC data slices 1 through X of each segment 1 through Y to the DS Storage units according to the previous location determination via the DSnet interface 114. The DS storage units will store the EC data slices and locally keep a table to convert virtual DSN addresses into physical storage addresses.

In an example of a data object retrieval operation, user device 116 sends a data file retrieval message to the DS gateway module 106 of the DS processing unit 102. The gateway module 106 translates the data file retrieval from the conventional file system interface into a retrieval message of a DSN memory interface convention. The grid module 110 receives the retrieval message and determines where (e.g., which DS storage units) the EC data slices for each segment of the data file should be. The storage module 112 retrieves the EC data slices from each of the determined DS storage units and passes the retrieved EC data slices to the grid module 110. The storage module may only retrieve the threshold T number of EC data slices if they are known to be intact (e.g., no CRC errors etc. as indicated by the DS storage unit and/or by the grid module 110). The grid module 110 de-slices the EC data slices and decodes the de-sliced data in accordance with the error coding algorithm to produce the data segments. The grid module 110 passes the data segments to the access module 108 which re-assembles the data file by aggregating the data segments in order. The access module 108 passes the data file to the gateway module 106 which converts the format to the file system protocol of the first user device 116.

Figure 10:
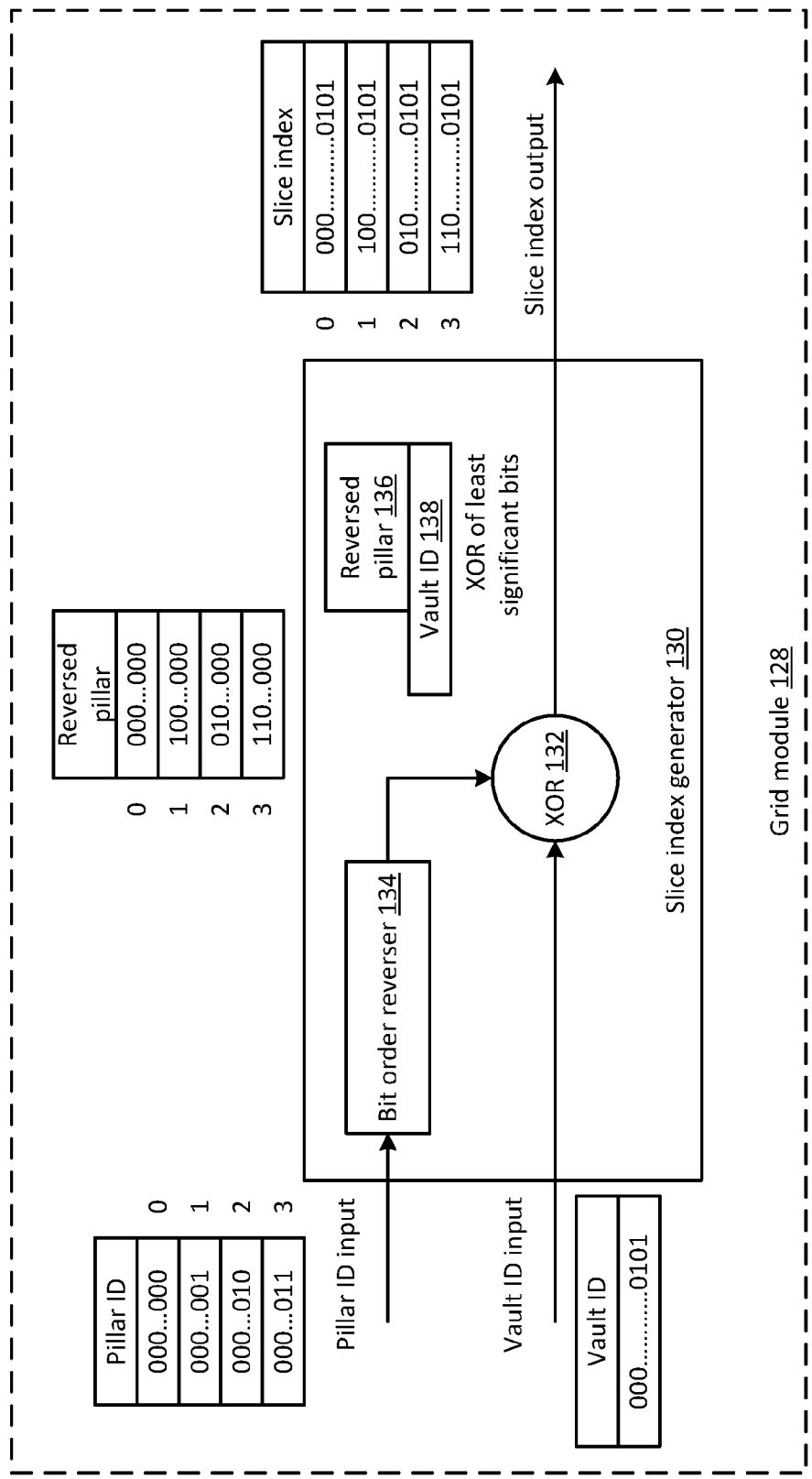
FIG. 10 is a schematic block diagram of an embodiment of a grid module in accordance with the invention.

FIG. 10 is a schematic block diagram of an embodiment of a grid module 128 that includes a slice index generator 130. The slice index generator 130 includes an exclusive OR (XOR) function 132 and a bit order reverser 134. The bit order reverser 134 creates a reversed pillar 136 from the pillar identifier. The reverser 134 swaps the most significant bit with the least significant bit, followed by reversing the second most significant bit with the second least significant bit, followed by a continuation of this pattern until all of the bits have been swapped. The reversed pillar 136 may contain the same number of bits as the slice index. If needed, the bit order reverser pads out zeros to fill the field to the right.

The slice index generator 130 generates the slice index by performing the XOR function 132 on the reversed pillar 136 and the least significant bits of vault identifier 138. The XOR 132 process results in better distribution properties of addresses.

Figure 11:
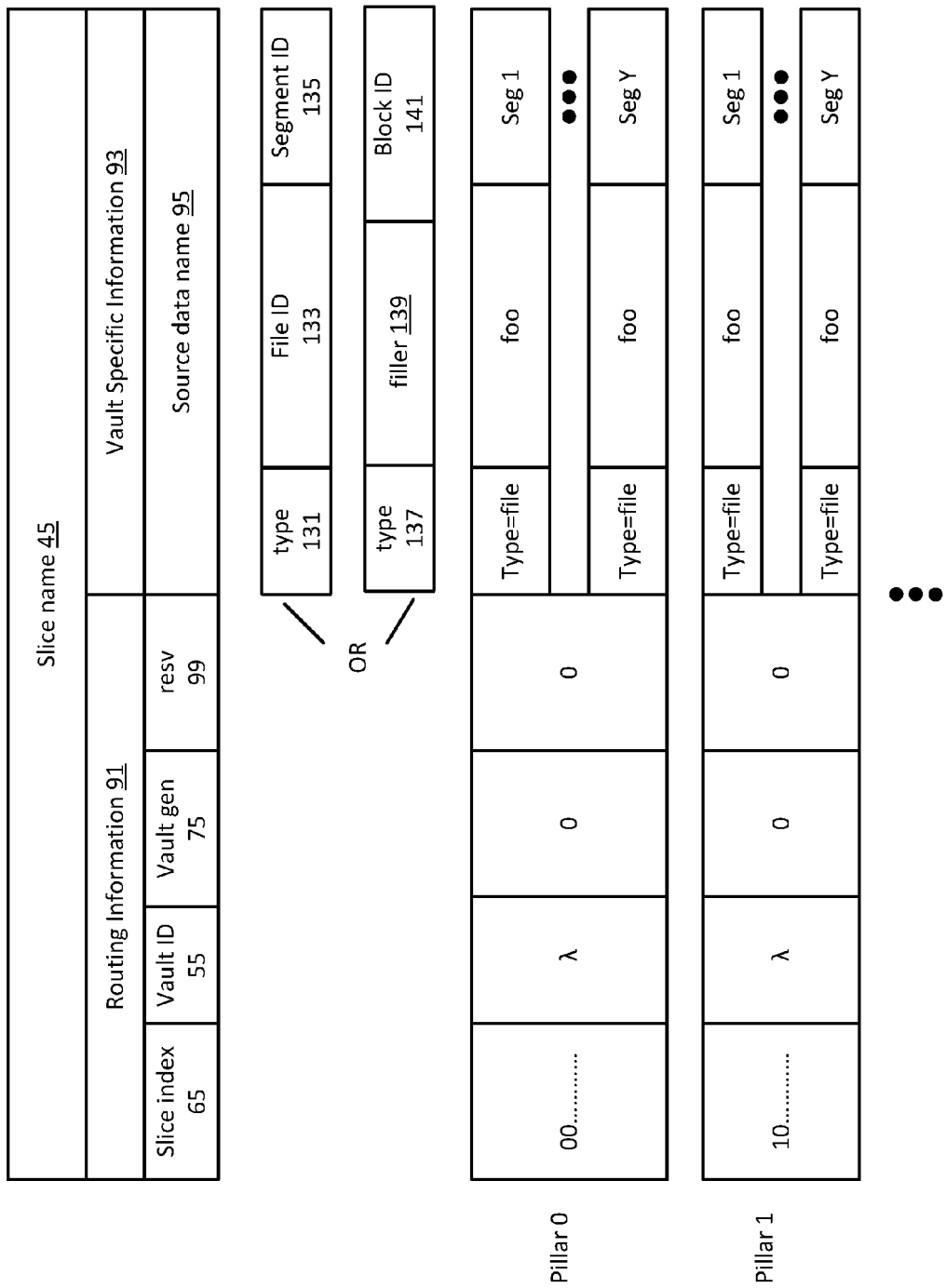
FIG. 11 is a diagram of another embodiment of a dispersed storage address table in accordance with the invention.

FIG. 11 is a diagram of another embodiment of a dispersed storage address table for the slice name 45 that includes routing information 91 unique across the entire DSN and vault specific information 93 that contains vault specific source data name 95 that is unique to the vault user and may be reused between vaults (e.g., the same file identifiers may be used in different vaults). The vault specific source data name 95 may include file and segment identifiers or block identifiers.

The source data name 95 has at least two format instances. In a first instance for data files, the source data name 95 contains a type field 131, the file identifier 133, and the data segment identifier 135. The type field 131 may be two bytes, the file identifier 133 may be sixteen bytes, and the data segment identifier 135 may be six bytes. In a second instance for data blocks, the source data name 95 contains a type field 137, a filler field of zeros 139, and the block identifier 141. The type field 137 has the same number of bytes as in the first instance, the filler field 139 is fourteen bytes of zeros, and the block identifier 141 is eight bytes.

The gateway module of FIG. 9 may set the type field based on the type of data object, e.g., file or blocks. The type field may also specify other types such as various live media streams which may be stored as files, blocks, and/or another format such as a combination. The gateway module may assign the file identifier as a random number or based in part on the object name (e.g., containing at least some of the bits from the object name or as a result of an algorithm that utilizes the object name). From that point forward, the object name and file identifier are always linked and the relationship may be stored in the user vault.

The gateway module may assign the block identifier to be the same as the object name (user OS system block ID) when the data object is a series of data blocks. The block identifier may also be set as a function of an algorithm that is based in part on the object name. In an example, the algorithm may be an offset number translation (e.g., add 1000).

The DS processing module and all other DSN elements may read the type field to determine how to interpret the rest of the source data name (e.g., files or blocks).

Figures 12A, 12B:
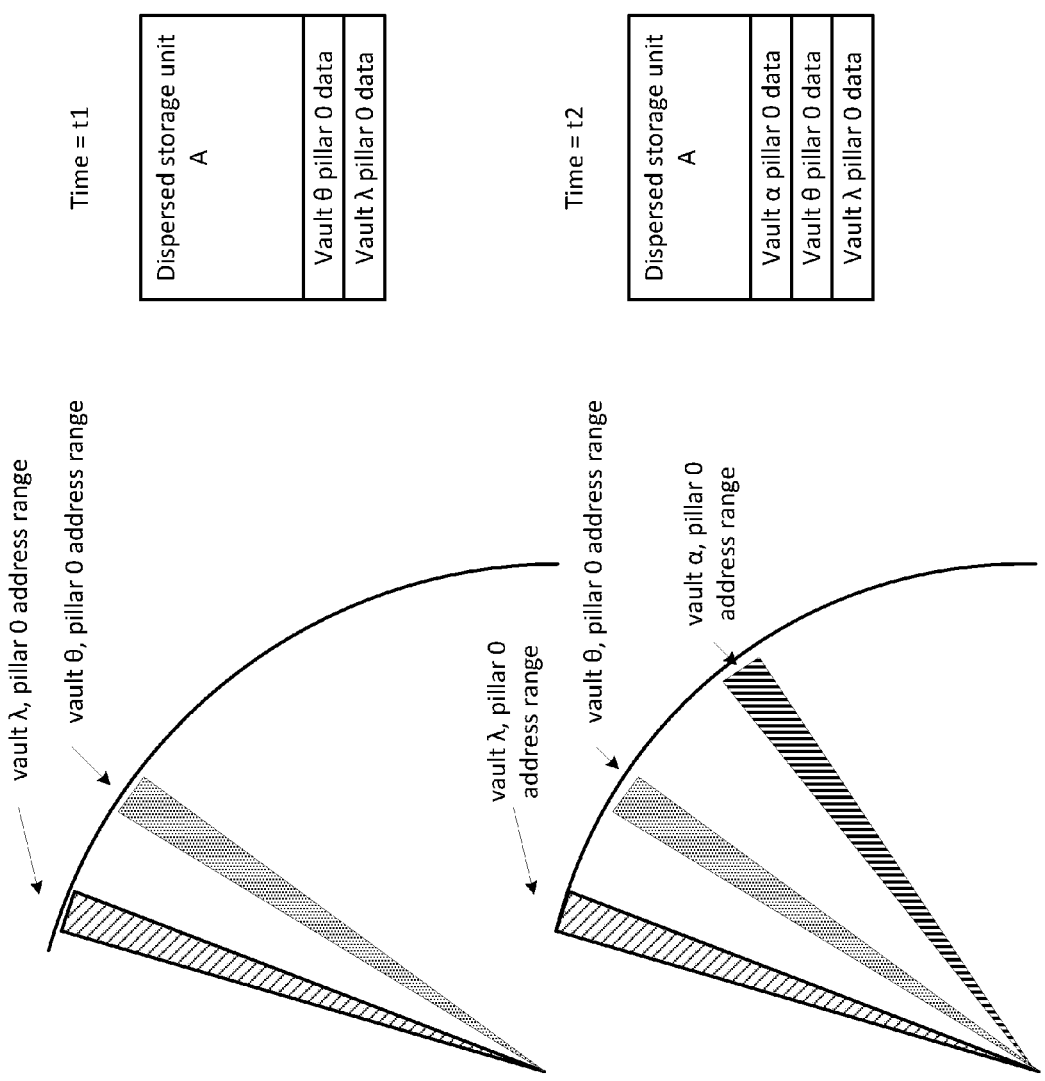
FIG. 12a is a diagram of another embodiment of a dispersed storage memory mapping in accordance with the invention.
FIG. 12b is a diagram of another embodiment of a dispersed storage memory mapping in accordance with the invention.

FIG. 12a is a diagram of another embodiment of a dispersed storage memory mapping at time t1 that includes a close-in examination of one section of the DSN address circle of FIG. 5. In an example, vault λ has a pillar 0 DSN address range very close to the vault θ pillar 0 DSN address range. Similar pillar numbers will be located near each other on the circular DSN address circle since the slice index is the most significant part of the DSN address and the slice index is derived from the pillar number. In an example, the DS processing unit may assign a single DS storage unit A to the same pillar number of vaults λ and θ. Other storage units (not shown) may support the other pillars (not shown) of these vaults. In one instance, a single DS storage unit may support other same pillar number pillars of these vaults. In another instance, different DS storage units may support other same pillar number pillars of these vaults. The assignment of DS storage units to vault address ranges may be done by the DS processing unit, the DS managing unit, the storage integrity processing unit, and/or the DS storage unit. The DS processing unit may update the virtual DSN address to physical DS storage unit table to indicate the above changes.

FIG. 12b is a diagram of another embodiment of a dispersed storage memory mapping at time t2 that includes a close-in examination of one section of the DSN address circle of FIG. 5. In an example, vault λ has a pillar 0 DSN address range close to the vault θ pillar 0 DSN address range. A vault α pillar 0 DSN address range has been assigned at t2. In an example, the DS processing unit may assign a single DS storage unit A to the same pillar number of vaults λ, θ, and now α since DS storage unit A has ample storage capacity at t2. Other storage units (not shown) may support the other pillars (not shown) of these vaults. In one instance, a single DS storage unit may support other same pillar number pillars of these vaults. In another instance, different DS storage units may support other same pillar number pillars of these vaults. The DS processing unit may update the virtual DSN address to physical DS storage unit table to indicate the above changes.

Figures 12C, 12D:
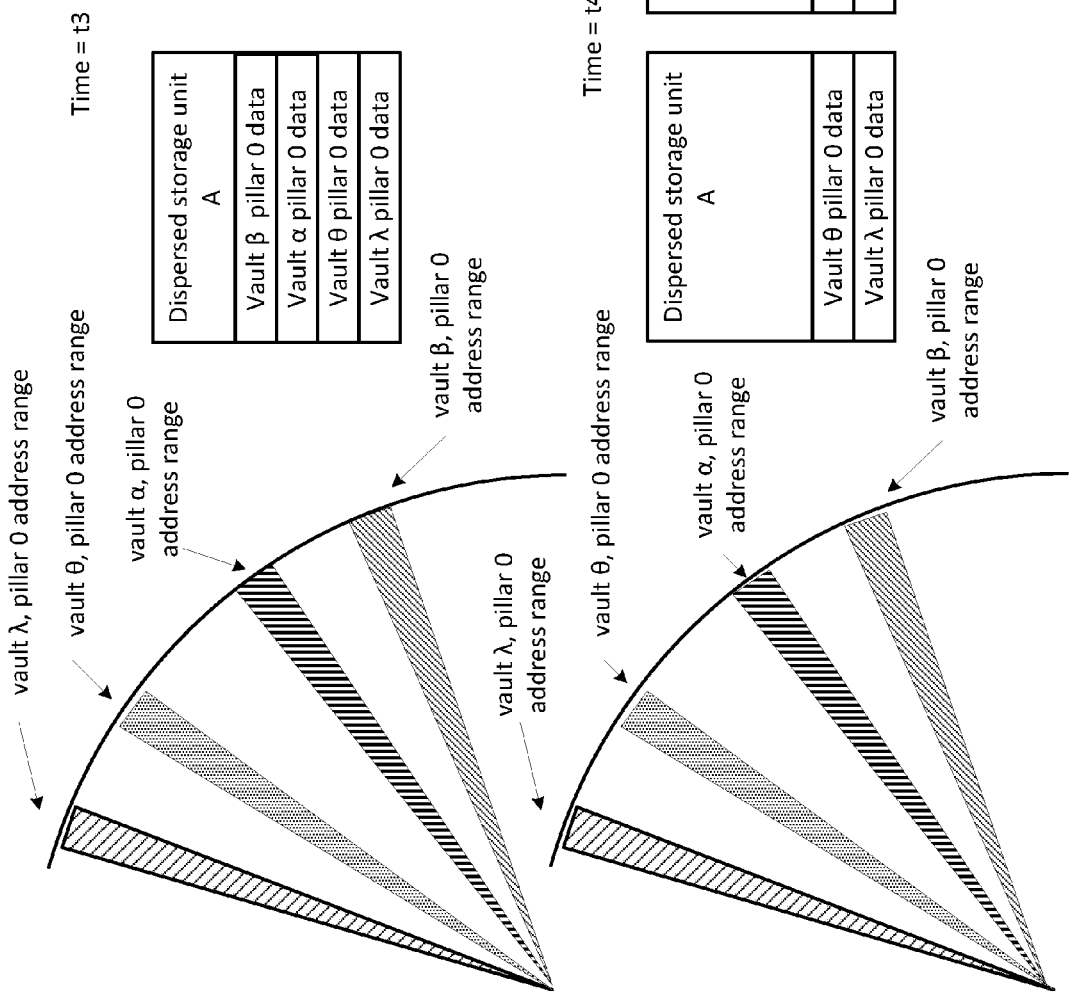
FIG. 12c is a diagram of another embodiment of a dispersed storage memory mapping in accordance with the invention.
FIG. 12d is a diagram of another embodiment of a dispersed storage memory mapping in accordance with the invention.

FIG. 12c is a diagram of another embodiment of a dispersed storage memory mapping at time t3 that includes a close-in examination of one section of the DSN address circle of FIG. 5. In an example, vault λ has a pillar 0 DSN address range very close to the vault θ pillar 0 DSN address range and vault α pillar 0 DSN address range. The DS processing unit may assign vault β pillar 0 DSN address range at t3. In an example, the DS processing unit may assign a single DS storage unit A to the same pillar number of vaults λ, θ, α, and now β since DS storage unit A has ample storage capacity at t3. Other storage units (not shown) may support the other pillars (not shown) of these vaults. In one instance, a single DS storage unit may support other same pillar number pillars of these vaults. In another instance, different DS storage units may support other same pillar number pillars of these vaults. The DS processing unit may update the virtual DSN address to physical DS storage unit table to indicate the above changes.

FIG. 12d is a diagram of another embodiment of a dispersed storage memory mapping at time t4 that includes a close-in examination of one section of the DSN address circle of FIG. 5. In an example, vault λ has a pillar 0 DSN address range very close to the vault θ pillar 0 DSN address range, and the vault α has a pillar 0 DSN address range very close to the vault β pillar 0 DSN address range. DS storage unit B is added at the time t4 to carry some of the storage load. DS storage unit B may be collocated at the same site as DS storage unit A since they will serve the same pillar numbers and co-location will facilitate a faster transfer of EC data slices from DS storage unit A to DS storage unit B to balance the load. In an example, the DS processing unit may assign DS storage unit A to pillar number 0 of vaults λ, and θ, while DS storage unit B will be assigned to pillar 0 of vaults α and β. In that assignment, the DS processing unit may facilitate the transfer of the pillar 0 EC data slices for vaults x and y to DS storage unit B. Other storage units (not shown) may support the other pillars (not shown) of these vaults. In one instance, a single DS storage unit may support other same pillar number pillars of these vaults. In another instance, different DS storage units may support other same pillar number pillars of these vaults. The re-assignment of DS storage units to vault address ranges and the re-balancing of EC data slices may be done by the DS processing unit, the DS managing unit, the storage integrity processing unit, and/or the DS storage unit. The DS processing unit may update the virtual DSN address to physical DS storage unit table to indicate the above changes.

Figures 12E, 12F:
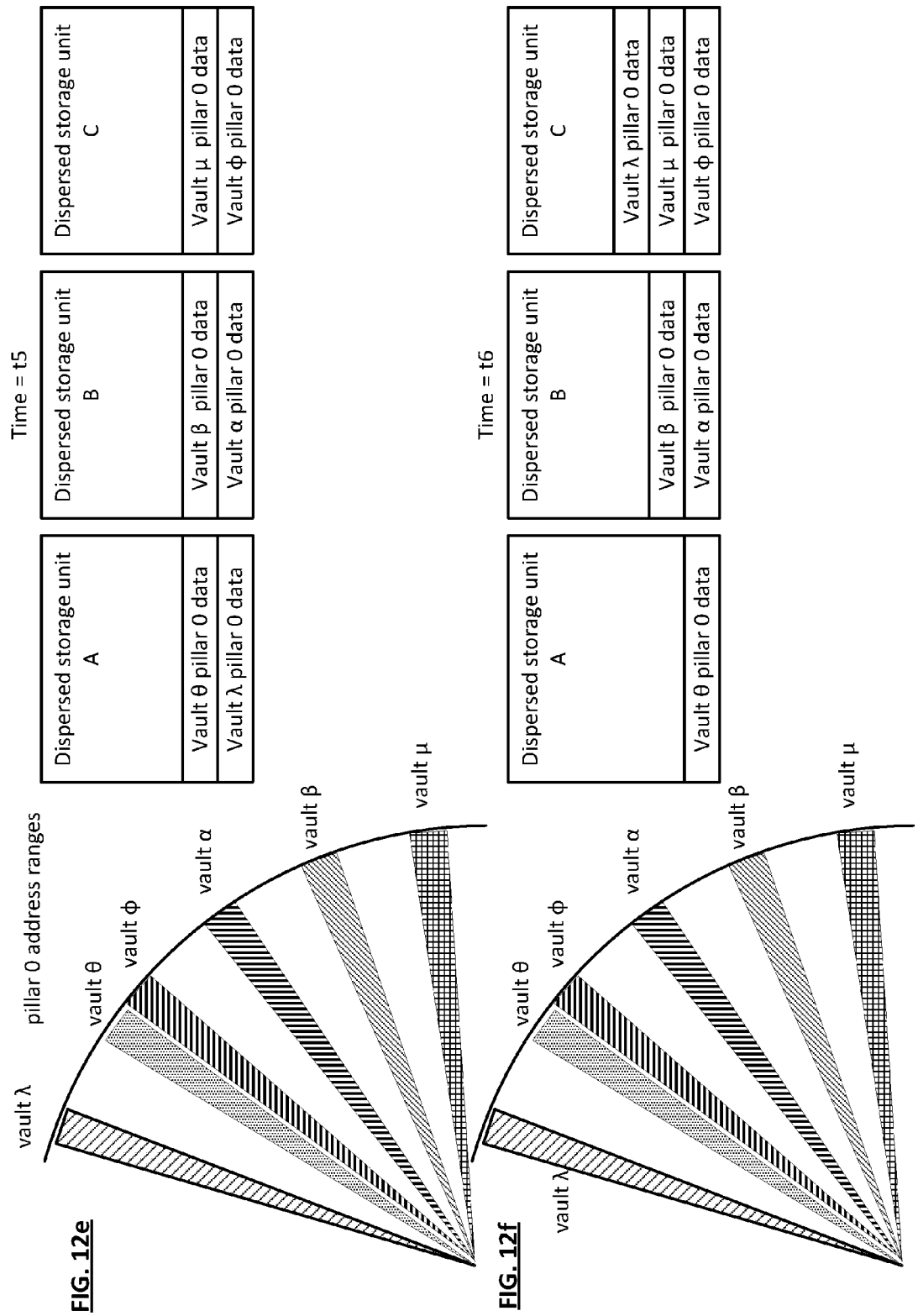
FIG. 12e is a diagram of another embodiment of a dispersed storage memory mapping in accordance with the invention.
FIG. 12f is a diagram of another embodiment of a dispersed storage memory mapping in accordance with the invention.

FIG. 12e is a diagram of another embodiment of a dispersed storage memory mapping at time t5 that includes a close-in examination of one section of the DSN address circle of FIG. 5. In an example, vault λ has a pillar 0 DSN address range close to the vault θ pillar 0 DSN address range, and the vault α has a pillar 0 DSN address range very close to the vault β pillar 0 DSN address range. DS storage unit C is added at the time t5 to support new vaults φ and μ, which have similar address ranges for pillar 0. DS storage unit C may be collocated at the same site as DS storage units A and B since they will serve the same pillar numbers and co-location will facilitate any required future transfer of EC data to balance the load. In an example, the DS processing unit may assign DS storage unit A to pillar number 0 of vaults λ, and θ, and DS storage unit B will be assigned to pillar 0 of vaults α and β, while DS storage unit C will be assigned to pillar 0 of vaults φ and μ. Other storage units (not shown) may support the other pillars (not shown) of these vaults. In one instance, a single DS storage unit may support other same pillar number pillars of these vaults. In another instance, different DS storage units may support other same pillar number pillars of these vaults. The DS processing unit may update the virtual DSN address to physical DS storage unit table to indicate the above changes.

FIG. 12f is a diagram of another embodiment of a dispersed storage memory mapping at time t6 that includes a close-in examination of one section of the DSN address circle of FIG. 5. In an example, the DS processing module determines that DS storage unit A is filling up while DS storage unit C has ample capacity. The DS processing module determines that vault λ pillar 0 will be transferred to DS storage unit C. The determination may be based on remaining capacity, performance, billing rates, user ownership, and or some other metric to drive improved operations. Other storage units (not shown) may support the other pillars (not shown) of these vaults. In one instance, a single DS storage unit may support other same pillar number pillars of these vaults. In another instance, different DS storage units may support other same pillar number pillars of these vaults. The DS processing unit may update the virtual DSN address to physical DS storage unit table to indicate the above changes.

Figure 13:
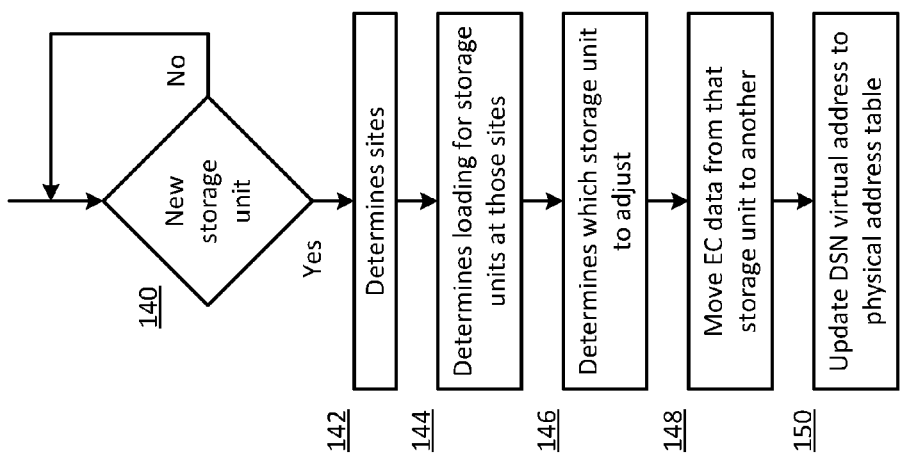
FIG. 13 is a logic diagram of an embodiment of a method for address assignment in accordance with the present invention.

FIG. 13 is a logic diagram of an embodiment of a method for address assignment that starts with the step of determining if a new DS storage unit 140 has been added to the DSN. The determination may be made by the receipt of a registration message by the processing module of any of the DS managing unit, the DS processing unit, the storage integrity processing unit, and/or another DS storage unit.

The processing module determines the site location of the new DS storage unit 142. The determination may be indicated by the registration message or it may be indicated by a proximity message from the new DS storage unit. The new DS storage unit may determine which other DS storage units are at the same site by performing a series of local area network (LAN) pings. The new DS storage unit will create the proximity message based on the results of the LAN pings. The DS storage unit may also accept a site indicator input from a configuration operation (e.g., from a local manager or the DS managing unit).

DS storage units may be simultaneously added as a unit set to multiple sites to support each pillar of one or more vaults. The processing module site determination may also determine if a unit set has been activated by correlating the new sites to the virtual DSN address to physical DS storage unit tables (as discussed in FIG. 4).

The processing module determines the loading for existing DS storage units at the site(s) indicated by the site determination for the new DS storage units 144. The loading may indicate available storage capacity and/or performance metrics that affect loading including storage latency times, retrieval latency times, network access bandwidth, availability, memory usage growth rate (e.g., bytes of incremental storage used per unit of time), and/or any other past performance metric that may indicate potential future performance. Available storage capacity may be expressed as bytes or as a percentage of the total size of the DS storage unit storage capacity.

The processing module determines which existing DS storage unit(s) to adjust by comparing the loading to a loading threshold 146. In an example, the loading threshold may indicate that DS storage units should be adjusted if the available storage capacity falls below 10% of the total. In another example, the loading threshold may indicate that DS storage units should be adjusted if the available storage capacity is predicted to only last less than one week based on the current memory usage growth rate. The processing module may attempt to match a new unit set to an existing unit set of DS storage units that have the most unfavorable loading as compared to the loading thresholds. The processing module may match DS storage units and new DS storage units at the same site to facilitate rapid file transfer in the rebalancing step over a LAN connection.

The processing module determines what volume and which particular EC data slices to move from the DS storage unit to the new DS storage unit 148. Volume determination may be based on a threshold, a predetermined number, a DS managing unit input, and/or a target new percentage of available storage capacity. For example, the new percentage of available storage capacity may be 60% such that the DS storage unit will be 40% full after the rebalancing step. The determination of which EC data slices to move may be based on which user vaults are present, vault boundaries, generation boundaries, and/or file boundaries. In an example, vault λ pillar 0, generations 0000-7FFF will remain on the DS storage unit but generations >7F00 will be moved to the new DS storage unit. As generations may be quite large, portions of the same generation may be split between two or more DS storage units. In such a scenario, the split may occur on file boundaries such that all of the same pillar segments for the same data file are stored on the same DS storage unit.

The processing module updates the virtual DSN address to physical DS storage unit tables to reflect the new configuration 150. Subsequent store and retrieve operations will utilize the updated information to access the appropriate DS storage units.

FIG. 14 is a diagram of another embodiment of a dispersed storage address table for the slice name 45 that includes routing information 91 unique across the entire DSN and vault specific information 93 that contains vault specific source data name that is unique to the vault user per generation and may be reused between vaults (e.g., the same file identifiers may be used in different vaults). The vault specific source data name 95 may include file and segment identifiers or block identifiers. The vault specific information fields were discussed in more detail above with reference to FIG. 11.

The routing information field 91 may contain the slice index 65, the vault identifier 55, the vault generation 75, and the reserved field 99. In an embodiment the slice index 65 may be two bytes, the vault identifier 55 may be a sixteen bytes, the vault generation 75 may be two bytes, and the reserved field 99 may be four bytes.

In an example, the user vault specifies that four pillars are used. The slice index field 65 is based on the vault ID and pillar ID such that the very most significant bits sequence from 00 to 11 to provide the evenly distributed DSN address ranges illustrated in FIG. 5. The determination of the slice index was discussed in more detail above with reference to FIG. 10.

The vault identifier 55 may be a sixteen byte universally unique identifier (UUI). A given vault identifier is uniquely associated with one user on the entire DSN and the vault identifier can be randomly assigned (but constantly associated with the same user) by the DS processing unit, the DS managing unit, the storage integrity processing unit, and/or the DS storage unit.

The vault generation 75 may extend the address block for a given vault and facilitate a simplified expansion process. The vault generation may be assigned by the DS processing unit, the DS managing unit, the storage integrity processing unit, and/or the DS storage. In an example, the grid module determines to add a new generation 1 to vault λ based on a new DS storage unit being added and/or if a threshold of generation utilization has been reached. The processing module of the grid module may add the new generation 1. The new generation may also be added by the DS managing unit, the storage integrity processing unit, the user device, and/or the DS storage unit.

In an example, a new DS storage unit may be added to support the new generation 1. In such a scenario, the processing module updates the virtual DSN address to physical DS storage unit table to reflect that the old DS storage unit for that particular vault supports an address range inclusive of generation 0 and that a new DS storage unit for the same vault supports an address range inclusive of the new generation 1.

FIG. 15a is a diagram of another embodiment of a dispersed storage address mapping that includes a close-in examination of one section of the DSN address circle of FIG. 5 focusing on the ranges of generations of a given vault. In an example, where the vault generation field is two bytes, the vault generation numbers will range from 0000 to FFFF. The grid module may assign new vault generation numbers from time to time as either new DS storage units are added or when current generations reach a capacity threshold. The vault generation number may be randomly assigned within its range or it may be assigned according to an algorithm. The method of assignment of the vault generation number will be further discussed with reference to FIGS. 15b-15c.

FIG. 15b is a diagram of another embodiment of a dispersed storage address mapping where the vault generation range is represented around a circle. At the top are the first and the last numbers (e.g., 0000 and FFFF). The grid module may utilize an even distribution algorithm to add new vault generations such that DS storage assignments may never support adjacent vault generations to promote a more robust system. In other words, as DS storage units generally cover sequential ranges of virtual DSN addresses as illustrated in FIG. 4, avoid a potential simultaneous failure of two or more adjacent generations by assigning vaults to vault generations that have significant distance between them on the address circle. For example the first generation to be assigned is generation 0 and it may be assigned a vault generation number of 0100 on the circle. As that generation fills and when a new DS storage unit is activated, the second generation to be assigned is generation 1 and it may be assigned a vault generation number of 8100. The even distancing algorithm continues and subsequent generations may be added as illustrated in FIG. 15b. DS storage units supporting sequential address ranges may eventually support more than one generation but they will not be sequential in generation age. A DS storage unit failure will not affect two generations of adjacent age.

FIG. 15c is a diagram of another embodiment of a dispersed storage address mapping where the grid module utilizes a sequential vault generation number assignment algorithm to add new generations. For example, the grid module assigns the first generation to vault generation number 0000 and the grid module assigns the second generation to vault generation number 0001 and so on in sequence. The grid module may assign new DS storage units to each new vault generation such that a DS storage unit failure will only impact one generation.

Figure 16A:
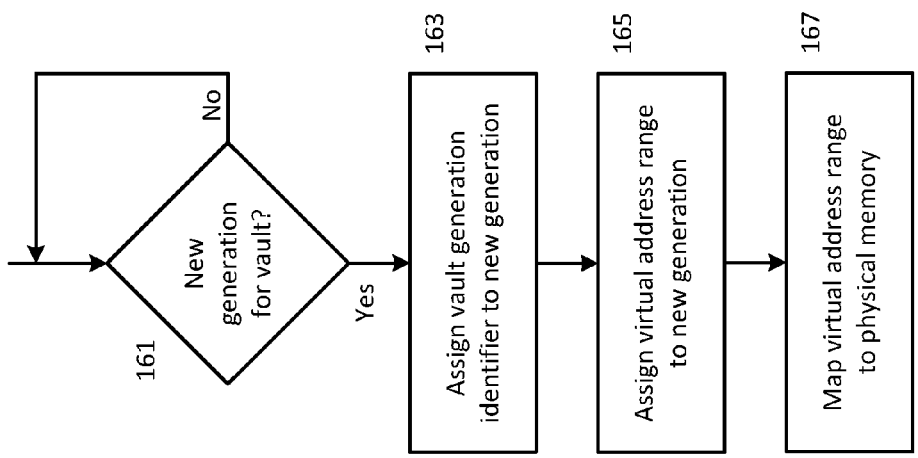
FIG. 16a is a logic diagram of another embodiment of a method for address assignment in accordance with the present invention.

FIG. 16a is a logic diagram of another embodiment of a method for address assignment where the processing module determines that a new generation should be added for a vault 161. The determination may be based on, for example, a comparison of the storage utilization within the physical memory of a current generation of the vault to a generation utilization threshold. When the storage utilization compares unfavorably to the generation utilization threshold, the new generation is added. The processing module may be a part of the DS managing unit, the DS storage unit, the storage integrity processing unit, the DS processing unit and/or the user device.

The processing module assigns a vault generation identifier to the new generation that uniquely identifies the new generation within the dispersed storage network 163. In addition, the processing module assigns a virtual address range within the virtual memory to the new generation 165. For example, the processing module can randomly assign the virtual address range to the new generation, utilize an even distribution algorithm to assign the virtual address range to the new generation or utilize a sequential assignment algorithm to assign the virtual address range to the new generation.

The processing module further maps the assigned virtual address range to physical memory 167. For example, since the physical memory includes a plurality of storage units, the processing module can update a table mapping the respective virtual address range of each generation of the vault to corresponding storage units. In an exemplary embodiment, the data associated with the new generation is stored in different storage units than the data associated with previous generations of the vault.

Figure 16B:
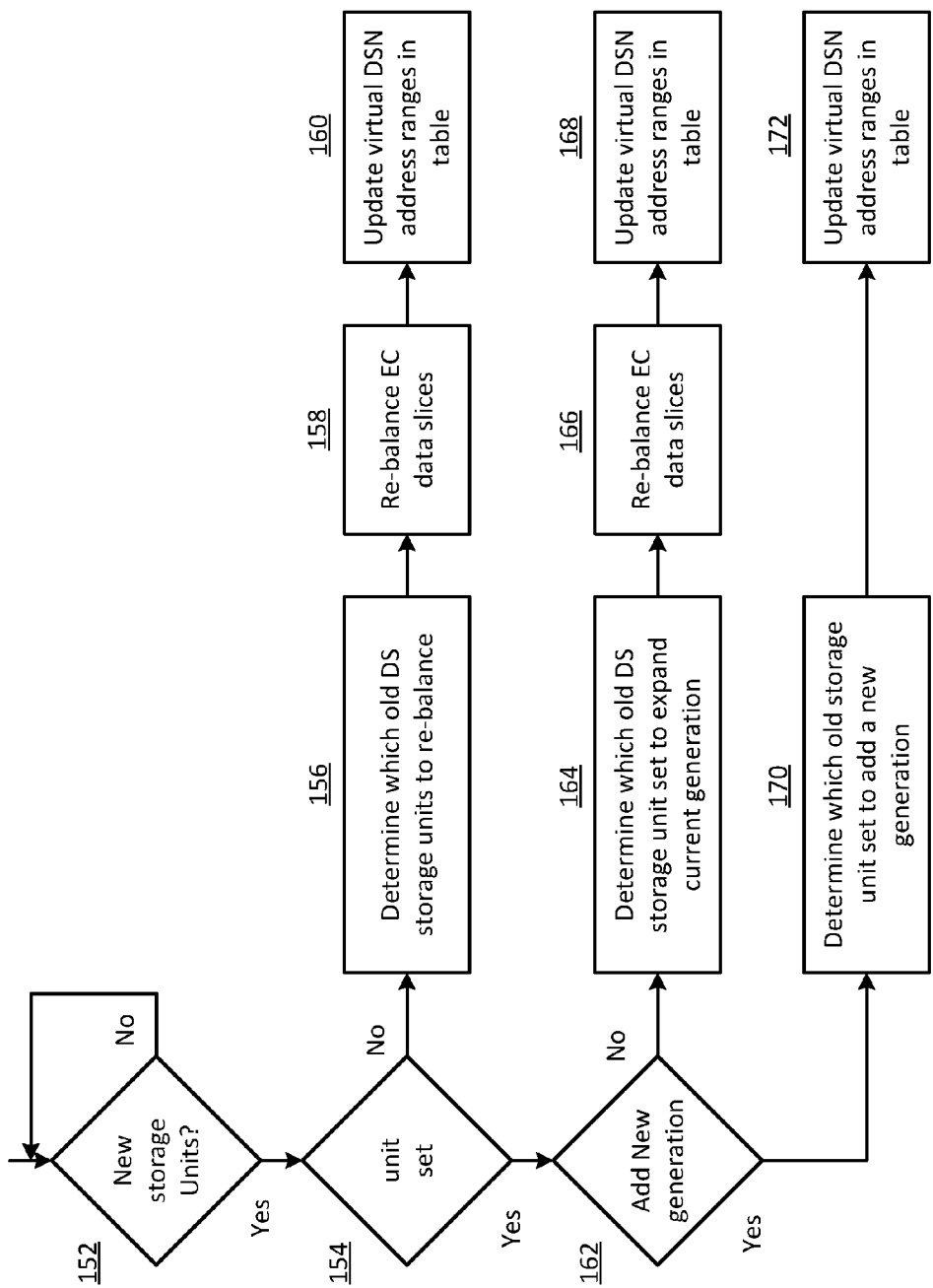
FIG. 16b is a logic diagram of another embodiment of a method for address assignment in accordance with the present invention.

FIG. 16b is a logic diagram of another embodiment of a method for address assignment where the processing module of the DS managing unit detects a new DS storage unit 152. The detection may be based on a registration message, a network ping, a manager command, and/or any other indicator that a new DS storage unit is now online. The processing module may be part of the DS managing unit, the DS storage unit, the storage integrity processing unit, the DS processing unit, and/or the user device.

The processing module determines if the new DS storage unit has companions in a unit set 154 (e.g., at the same sites as pillars of at least one vault). If the DS storage unit is not part of a unit set, then the processing module determines which of the old DS storage units at the site of the new DS storage unit to re-balance 156. The processing module may choose the DS storage unit with the least remaining storage capacity or one with another loading performance issue (e.g., transactions are slower than the average DS storage unit). The processing module transfers EC data slices from the chosen old DS storage unit to the new DS storage unit 158 and updates the virtual DSN address range to physical DS storage tables 160. The processing module may determine an amount of EC data slices to transfer based on a target capacity threshold after the transfer. In an example, the desired storage capacity threshold may be 70% available after the transfer.

The processing module will determine if a new generation is to be added when the DS storage unit was determined to be part of the unit set that matched one or more current unit sets 162. The processing module may base the determination on comparing storage utilization within the current generation to a generation utilization threshold for each unit set. For example, if the processing module determines that the storage utilization of the current generation is 5% and the generation utilization threshold for this vault is 30%, then a new generation is not added. When the processing module determines that a new generation is not to be added, the processing module may choose the current unit set that is closest to the generation utilization threshold 164 (e.g., most full, but not so full as to add a new generation). The processing module transfers EC data slices from each DS storage unit of the chosen old unit set to the new DS storage units of the new unit set 166 and updates the virtual DSN address range to physical DS storage tables 168. The processing module may determine an amount of EC data slices to transfer based on a target capacity threshold after the transfer. In an example, the desired storage capacity threshold may be 70% available after the transfer.

The processing module will determine which old unit set to add a new generation when the processing module determines that a new generation is to be added 170. For example, the processing module may find an existing unit set with a high utilization (e.g., above a threshold) of the current generation. The processing module adds the generation for this unit set by updating the virtual DSN address to physical DS storage unit tables with the new vault generation range mapped to the set of DS storage units 172.

Figure 17:
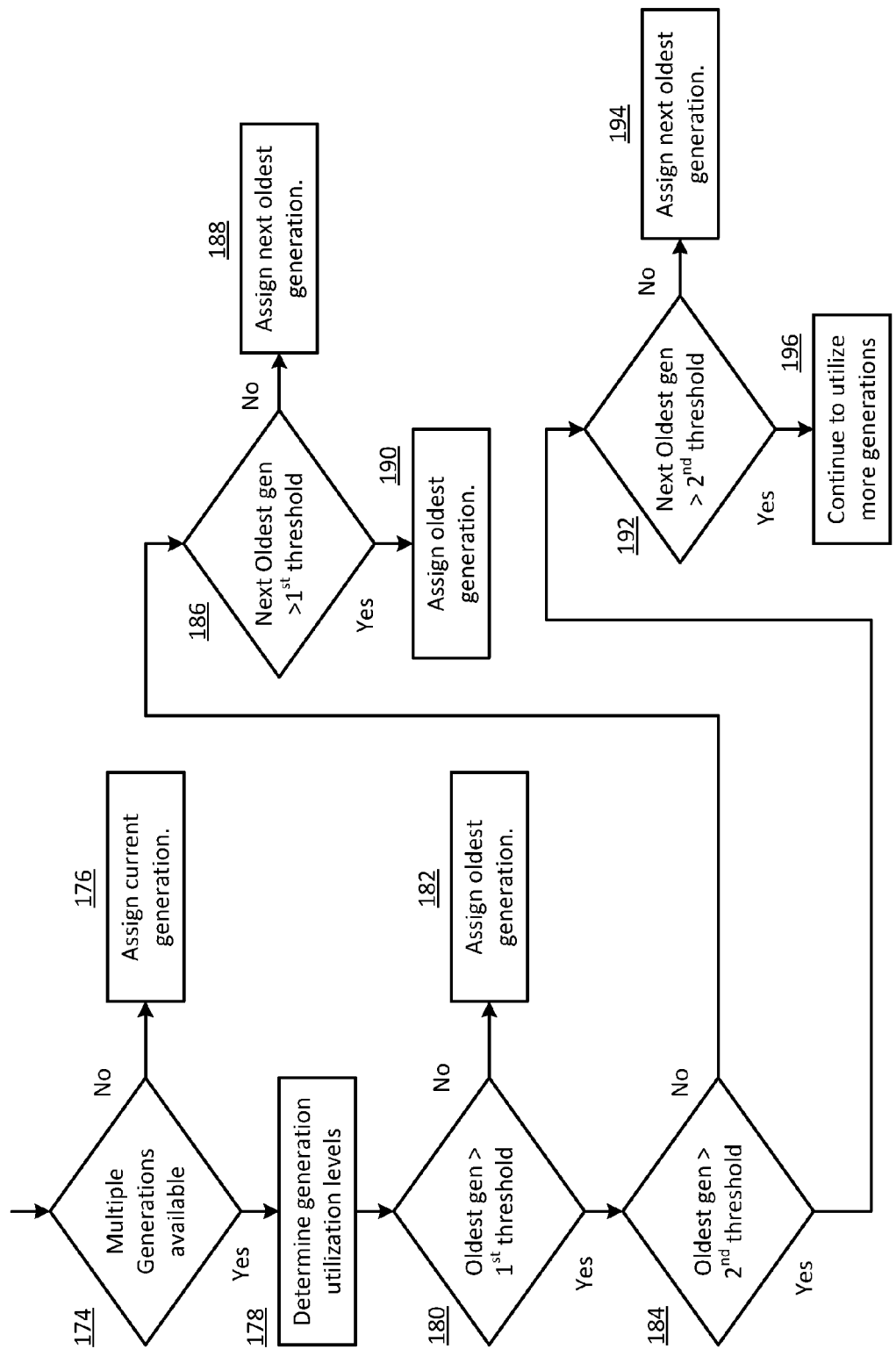
FIG. 17 is a logic diagram of another embodiment of a method for address assignment in accordance with the present invention.

FIG. 17 is a logic diagram of another embodiment of a method for address assignment where the processing module of the DS processing unit determines if multiple generations are available for a user vault when a new data object is to be dispersed 174. The processing module may be part of the DS managing unit, the DS storage unit, the storage integrity processing unit, the DS processing unit, and/or the user device. The determination may be based on a lookup into the virtual DSN address to physical DS storage unit tables. The processing module may assign the current vault generation when multiple generations are not available 176. The processing module fills in the vault generation field with the same current generation in the slice name for each dispersed EC data slice.

The processing module may determine the generation utilization levels when multiple generations are available 178. The determination may be based on storage utilization for each generation range (e.g., how much bulk data is stored for each generation) and/or source data name utilization (e.g., file identifiers). In an embodiment, the processing module may list each generation from oldest to newest with the amount of data stored and the number of source data names used for each.

The processing module may determine if the oldest generation has utilization levels greater than a first utilization threshold 180. For example, the amount of data stored in the generation may be over 10 terabytes and the number of source names utilized may be above 405 of the total possible numbers. If either is above its threshold, then the generation is above the threshold. The processing module may assign the oldest generation when the oldest generation has utilization levels that are not greater than the first utilization threshold 182.

The processing module may determine if the oldest generation has utilization levels greater than a second utilization threshold when the processing module has determined that the oldest generation has utilization levels greater than a first utilization threshold 184. The processing module may determine if the next oldest generation has utilization levels greater than the first utilization threshold when the processing module has determined that the oldest generation does not have utilization levels greater than the second utilization threshold 186. The processing module may assign the next oldest generation when the next oldest generation does not have utilization levels greater than the first utilization threshold 188. The processing module may assign the oldest generation when the next oldest generation has utilization levels greater than the first utilization threshold 190.

The processing module may determine if the next oldest generation has utilization levels greater than the second utilization threshold when the processing module has determined that the oldest generation has utilization levels greater than the second utilization threshold 192. The processing module may assign the next oldest generation when the next oldest generation does not have utilization levels greater than the second utilization threshold 194. The processing module may continue the process to the next oldest generation when the next oldest generation has utilization levels greater than the second utilization threshold 196. The process continues until the either the generation is assigned or the current generation is assigned.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A dispersed storage device for use within a dispersed storage network, comprising:
   a processing module operable to:
   determine whether to add a new generation for a vault, the vault identifying at least one user having data to be stored, the vault including a current generation: and
   when the new generation is to be added to the vault:
   assign a vault generation identifier to the new generation; and reserve memory for the new generation;
   wherein data stored in the current generation is different from data stored the new generation.

2. The dispersed storage device of claim 1, wherein the processing module is further operable to reserve memory for the new generation by:
   assigning a virtual address range of a virtual memory associated with the dispersed storage network to the new generation; and
   mapping the virtual address range to a physical memory for storage of the data therein.

3. The dispersed storage device of claim 2, wherein the physical memory includes a plurality of storage units and further comprising:
   a table mapping the respective virtual address range of each generation of the vault to corresponding ones of the plurality of storage units.

4. The dispersed storage device of claim 3, wherein:
   the data associated with the current generation is stored in different ones of the plurality of storage units than the data associated with the new generation.

5. The dispersed storage device of claim 3, wherein the processing module is further operable to:
   detect a new storage unit of the plurality of storage units;
   compare storage utilization within the physical memory of a current generation of the vault to a generation utilization threshold;
   when the storage utilization compares unfavorably to the generation utilization threshold, add the new generation.

6. The dispersed storage device of claim 5, wherein the processing module is further operable to:
   when the storage utilization compares favorably to the generation utilization threshold:
   transfer at least a portion of the data from an existing storage unit of the plurality of storage units to the new storage unit; and
   update the table.

7. The dispersed storage device of claim 3, further comprising an interface, and wherein the processing module is further operable to:
   determine a vault generation of a data object;
   slice a data segment of the data object into data slices, a number of the data slices corresponding to a number of pillars for storing the data object;
   create a slice name for each of the data slices, the slice name including a virtual memory address within a corresponding virtual address range of the vault generation, the virtual memory address including a pillar identifier that identifies a pillar associated with the data slice, the virtual address range being assigned to the pillar; and
   output, via the interface, a data slice of the data slices and the respective slice name to a corresponding one of the plurality of storage units for storage therein.

8. The dispersed storage device of claim 7, wherein the number of pillars is based on the vault generation and each of the pillars of the vault generation is assigned to a different one of the plurality of storage units.

9. The dispersed storage device of claim 7, wherein the processing module is further operable to:
determine storage utilization within the physical memory of each generation of the vault; and
select the vault generation for the data object based on the storage utilization of each generation.

10. The dispersed storage device of claim 3, wherein the processing module is further operable to randomly assign the virtual address range to the new generation.

11. The dispersed storage device of claim 3, wherein the processing module is further operable to utilize a sequential assignment algorithm to assign the virtual address range to the new generation in a sequential manner and to update the table to assign different ones of the plurality of storage units to each generation of the vault.

12. The dispersed storage device of claim 3, wherein the processing module is further operable to utilize an even distribution algorithm to assign the virtual address range to the new generation such that adjacent vault generations are automatically assigned to different ones of the plurality of storage units within the table.

13. The dispersed storage device of claim 2, wherein the processing module is further operable to determine whether to add the new generation by:
comparing storage utilization within the physical memory of a current generation of the vault to a generation utilization threshold; and
when the storage utilization compares unfavorably to the generation utilization threshold, adding the new generation.

14. A method for managing data storage within a dispersed storage network, the method comprising:
determining whether to add a new generation for a vault, the vault identifying at least one user having data to be stored, the vault including a current generation; and
when the new generation is to be added to the vault:
assigning a vault generation identifier to the new generation; and
reserving memory for the new generation;
wherein data stored in the current generation is different from data stored in the new generation.

15. The method of claim 14, wherein the reserving memory comprises:
assigning a virtual address range of a virtual memory associated with the dispersed storage network to the new generation; and
mapping the virtual address range to a physical memory for storage of the data therein.

16. The method of claim 15, wherein the physical memory includes a plurality of storage units and further comprising:
maintaining a table mapping the respective virtual address range of each generation of the vault to corresponding ones of the plurality of storage units.

17. The method of claim 16, further comprising:
storing the data associated with the current generation in different ones of the plurality of storage units than the data associated with the new generation.

18. The method of claim 16, wherein the determining whether to add the new generation further comprises:
detecting a new storage unit of the plurality of storage units;
comparing storage utilization within the physical memory of a current generation of the vault to a generation utilization threshold;
when the storage utilization compares unfavorably to the generation utilization threshold, adding the new generation.

19. The method of claim 16, further comprising:
determining a vault generation of a data object;
slicing a data segment of the data object into data slices, a number of the data slices corresponding to a number of pillars for storing the data object;
creating a slice name for each of the data slices, the slice name including a virtual memory address within a corresponding virtual address range of the vault generation, the virtual memory address including a pillar identifier that identifies a pillar associated with the data slice, the virtual address range being assigned to the pillar; and
outputting a data slice of the data slices and the respective slice name to a corresponding one of the plurality of storage units for storage therein.

20. The method of claim 19, wherein the number of pillars is based on the vault generation and further comprising:
assigning each of the pillars of the vault generation to a different one of the plurality of storage units.

* * * * *